(12) United States Patent
Peyton et al.

(10) Patent No.: US 9,265,302 B2
(45) Date of Patent: Feb. 23, 2016

(54) TETHERED FLUID-FILLED CHAMBERS

(75) Inventors: Lee D. Peyton, Tigard, OR (US); James C. Meschter, Portland, OR (US); Danielle L. Taylor, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 608 days.

(21) Appl. No.: 13/563,496

(22) Filed: Jul. 31, 2012

(65) Prior Publication Data

US 2012/0291313 A1 Nov. 22, 2012

Related U.S. Application Data

(62) Division of application No. 12/630,642, filed on Dec. 3, 2009, now Pat. No. 8,479,412.

(51) Int. Cl.
*A43B 13/20* (2006.01)
*A43B 13/18* (2006.01)
*A43B 3/00* (2006.01)
*A43B 21/28* (2006.01)

(52) U.S. Cl.
CPC ............... *A43B 13/20* (2013.01); *A43B 3/0052* (2013.01); *A43B 13/183* (2013.01); *A43B 21/28* (2013.01)

(58) Field of Classification Search
CPC .... A43B 13/20; A43B 13/203; A43B 13/206; A43B 3/0052; A43B 13/189; A43B 21/28
USPC ....................... 36/27, 35 B, 29, 7.8
See application file for complete search history.

(56) References Cited

U.S. PATENT DOCUMENTS

| 2,953,861 | A | * | 9/1960 | Horten | 36/7.8 |
| 2,968,105 | A | * | 1/1961 | Rizzo | 36/7.8 |
| 3,253,355 | A | | 5/1966 | Menken | |
| 3,984,926 | A | | 10/1976 | Calderon | |

(Continued)

FOREIGN PATENT DOCUMENTS

| CN | 1192660 A | 9/1998 |
| EP | 1929893 | 6/2008 |

(Continued)

OTHER PUBLICATIONS

Office Action dated Dec. 5, 2014 in Chinese Patent Application No. 201080054235.9.

(Continued)

*Primary Examiner* — Ted Kavanaugh
(74) *Attorney, Agent, or Firm* — Honigman Miller Schwartz and Cohn LLP; Matthew H. Szalach; Jonathan P. O'Brien

(57) ABSTRACT

An article of footwear may incorporate a chamber with an outer barrier and a tether element. The barrier may be formed from a polymer material that defines an interior cavity, and tether element may be located within the interior cavity and joined to opposite sides of the barrier. Upon pressurization of the chamber, the tether element may extend across the interior cavity and be placed in tension by the outward force of a pressurized fluid within the interior cavity. The tether element may have a variety of configurations. For example, the tether element may have a diagonal orientation, or different tether elements may have different lengths. A tether element may also have plates or tie pieces secured to opposite sides of the chamber, with one or more tethers extending between. Also, the tether element may include one of more sheets that extend across the interior cavity.

15 Claims, 37 Drawing Sheets

(56) References Cited

U.S. PATENT DOCUMENTS

| | | | |
|---|---|---|---|
| 4,025,974 A | 5/1977 | Lea et al. | |
| 4,183,156 A | 1/1980 | Rudy | |
| 4,219,945 A | 9/1980 | Rudy | |
| 4,287,250 A | 9/1981 | Rudy | |
| 4,340,626 A | 7/1982 | Rudy | |
| 4,513,449 A | 4/1985 | Donzis | |
| 4,619,055 A | 10/1986 | Davidson | |
| 4,874,640 A | 10/1989 | Donzis | |
| 4,906,502 A | 3/1990 | Rudy | |
| 4,912,861 A * | 4/1990 | Huang | 36/29 |
| 4,936,029 A * | 6/1990 | Rudy | 36/29 |
| 5,042,176 A | 8/1991 | Rudy | |
| 5,083,361 A * | 1/1992 | Rudy | 29/454 |
| 5,134,790 A | 8/1992 | Woitschaetzke et al. | |
| 5,343,637 A * | 9/1994 | Schindler | 36/28 |
| 5,369,896 A | 12/1994 | Frachey et al. | |
| 5,543,194 A | 8/1996 | Rudy | |
| 5,552,205 A * | 9/1996 | Lea | 428/74 |
| 5,572,804 A | 11/1996 | Skaja et al. | |
| 5,630,237 A | 5/1997 | Ku | |
| 5,713,141 A | 2/1998 | Mitchell et al. | |
| 5,741,568 A | 4/1998 | Rudy | |
| 5,755,001 A * | 5/1998 | Potter et al. | 12/142 P |
| 5,802,739 A | 9/1998 | Potter et al. | |
| 5,918,383 A | 7/1999 | Chee | |
| 5,952,065 A | 9/1999 | Mitchell et al. | |
| 5,987,781 A | 11/1999 | Pavesi et al. | |
| 5,993,585 A | 11/1999 | Goodwin et al. | |
| 6,013,340 A | 1/2000 | Bonk et al. | |
| 6,029,962 A | 2/2000 | Shortn et al. | |
| 6,041,521 A | 3/2000 | Wong | |
| 6,082,025 A | 7/2000 | Bonk et al. | |
| 6,098,313 A | 8/2000 | Skaja | |
| 6,119,371 A | 9/2000 | Goodwin et al. | |
| 6,127,010 A | 10/2000 | Rudy | |
| 6,127,026 A | 10/2000 | Bonk et al. | |
| 6,203,868 B1 | 3/2001 | Bonk et al. | |
| 6,321,465 B1 | 11/2001 | Bonk et al. | |
| 6,385,864 B1 | 5/2002 | Sell, Jr. et al. | |
| 6,837,951 B2 | 1/2005 | Rapaport | |
| 7,076,891 B2 * | 7/2006 | Goodwin | 36/29 |
| 7,131,218 B2 * | 11/2006 | Schindler | 36/29 |
| 7,386,946 B2 | 6/2008 | Goodwin | |
| 2002/0121031 A1 | 9/2002 | Smith et al. | |
| 2003/0097767 A1 | 5/2003 | Perkinson | |
| 2005/0039346 A1 | 2/2005 | Thomas et al. | |
| 2005/0097777 A1 | 5/2005 | Goodwin | |
| 2005/0183287 A1 | 8/2005 | Schindler | |
| 2007/0063368 A1 * | 3/2007 | Schindler | 264/45.1 |
| 2007/0169379 A1 | 7/2007 | Hazenberg et al. | |
| 2009/0288313 A1 * | 11/2009 | Rapaport et al. | 36/29 |
| 2011/0131831 A1 | 6/2011 | Peyton et al. | |
| 2012/0291311 A1 | 11/2012 | Peyton et al. | |
| 2012/0291312 A1 | 11/2012 | Peyton et al. | |

FOREIGN PATENT DOCUMENTS

| | | |
|---|---|---|
| WO | 2009143000 | 11/2009 |
| WO | 2012096637 | 7/2012 |

OTHER PUBLICATIONS

Voluntary Amendments filed May 31, 2013 in European Patent Application No. 10859615.6.
Office Action issued May 6, 2014 in Chinese Patent Application No. 201080054235.9.
International Search Report and Written Opinion mailed Jun. 28, 2012 in International Application No. PCT/US2010/055482.
International Preliminary Report on Patentability (including Written Opinion of the ISA) mailed Jul. 19, 2012, in International Application No. PCT/US2010/055482.
Response filed Oct. 20, 2014 in Chinese Patent Application No. 201080054235.9.
USPTO, Office Action for U.S. Appl. No. 13/563,421 mailed Apr. 14, 2015.
USPTO, Office Action for U.S. Appl. No. 13/563,458, mailed Apr. 14, 2015.
European Patent Office, Office Action for EP Application No. 10859615.6, mailed May 15, 2015.

* cited by examiner

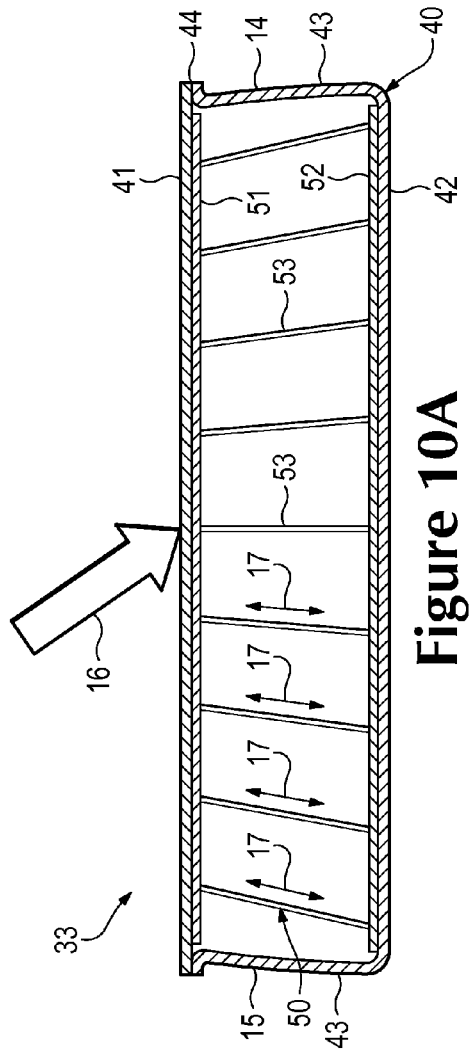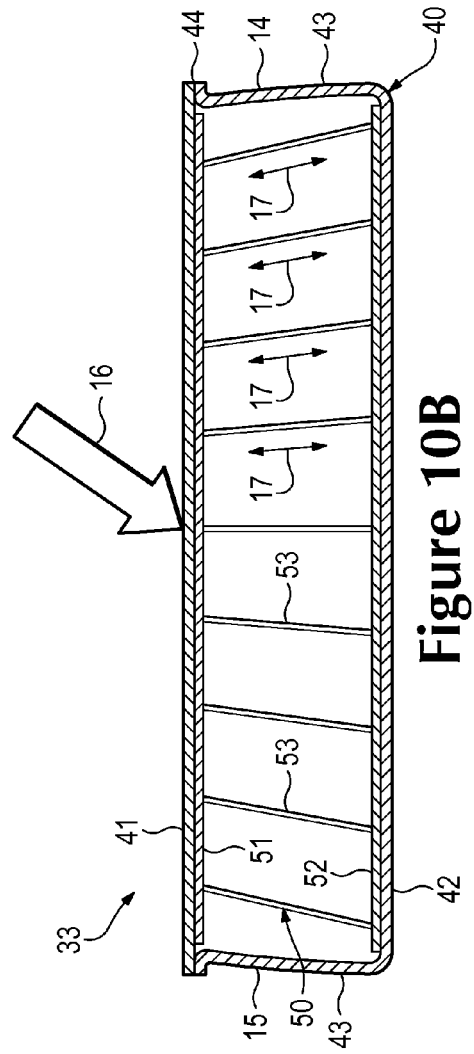

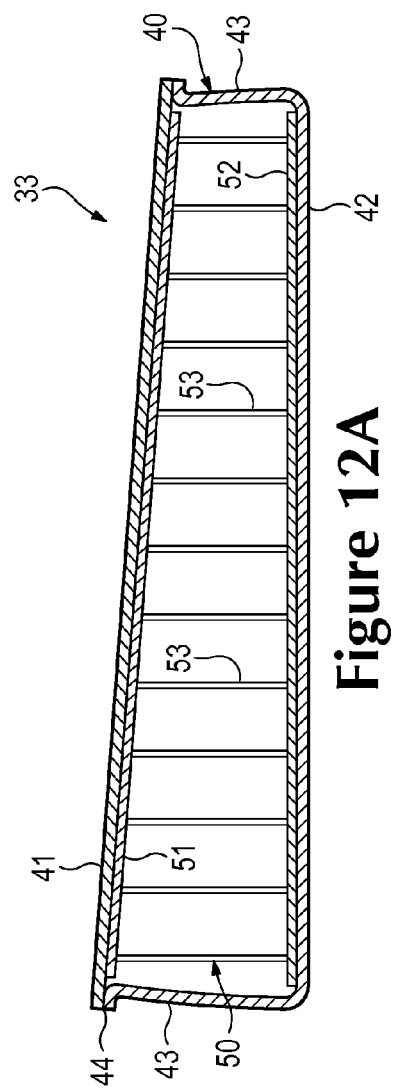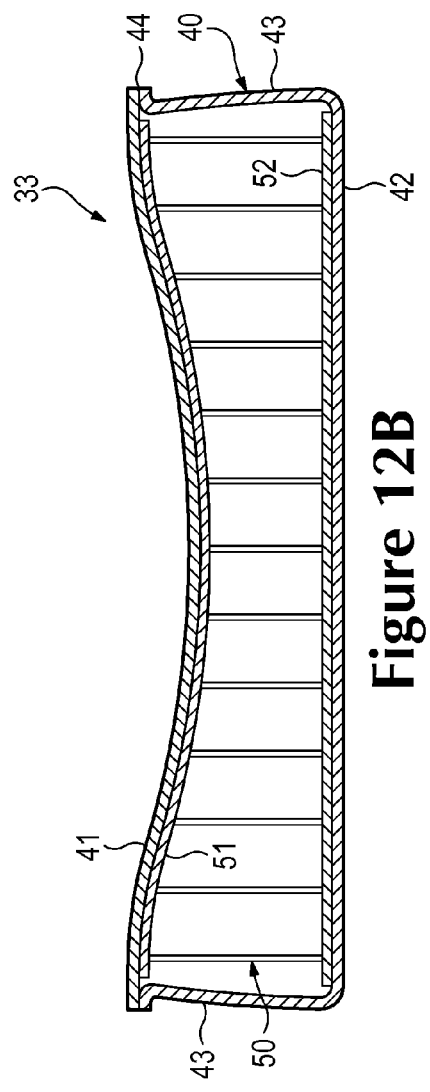

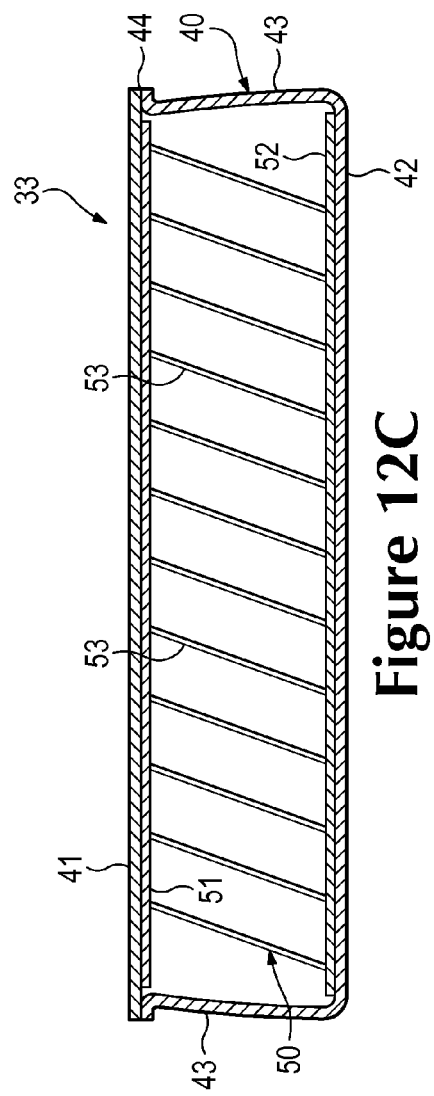
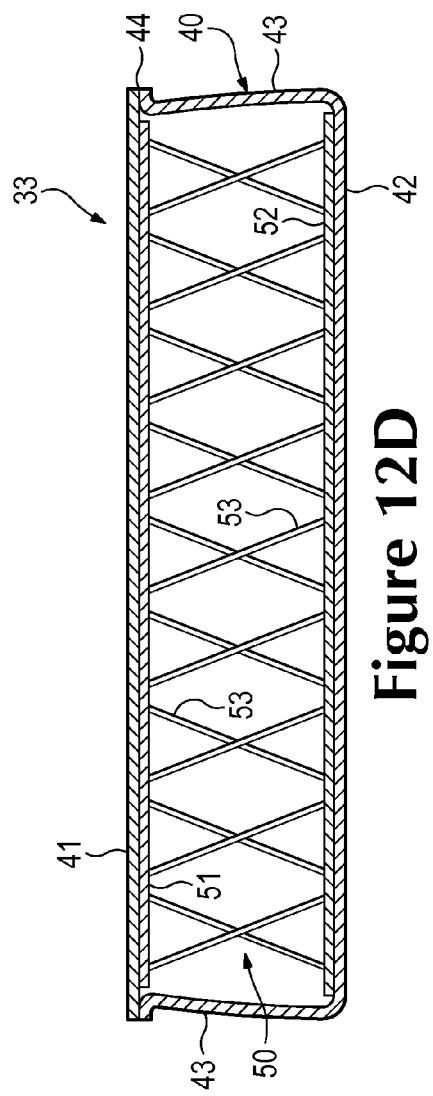

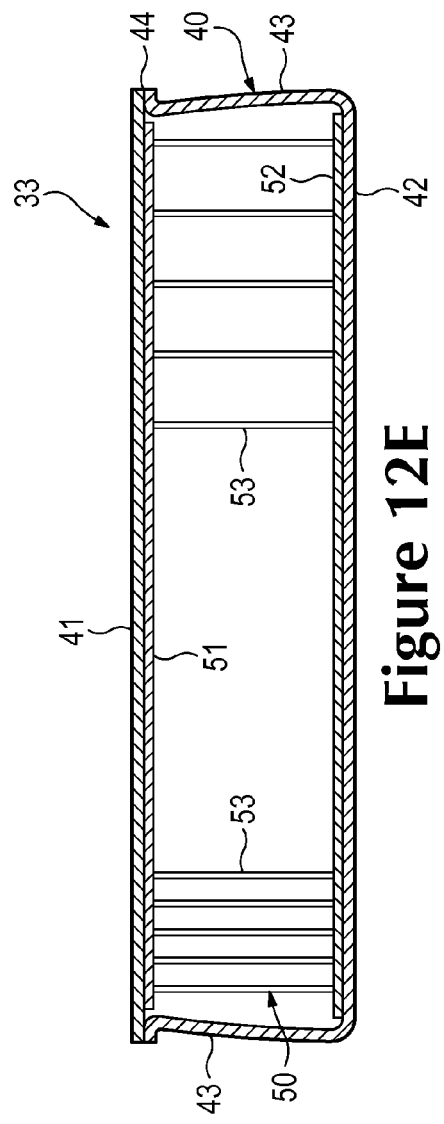
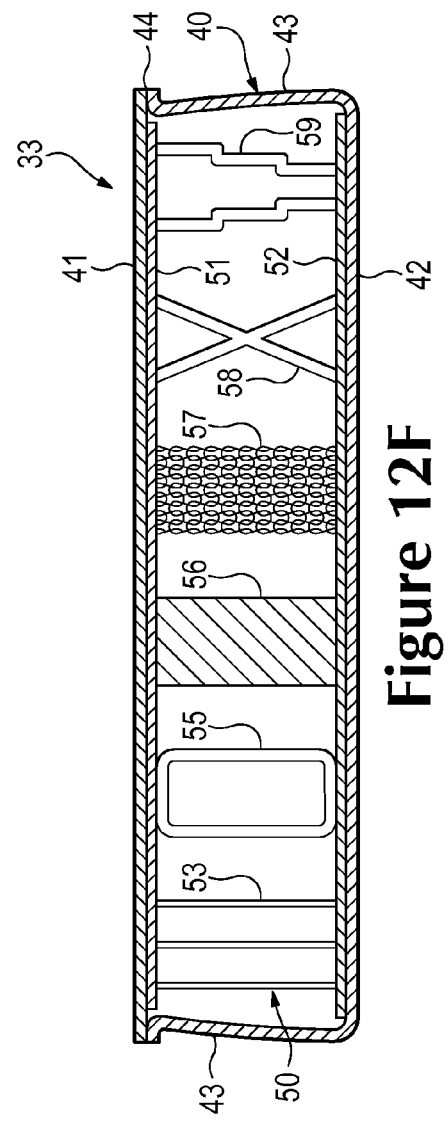

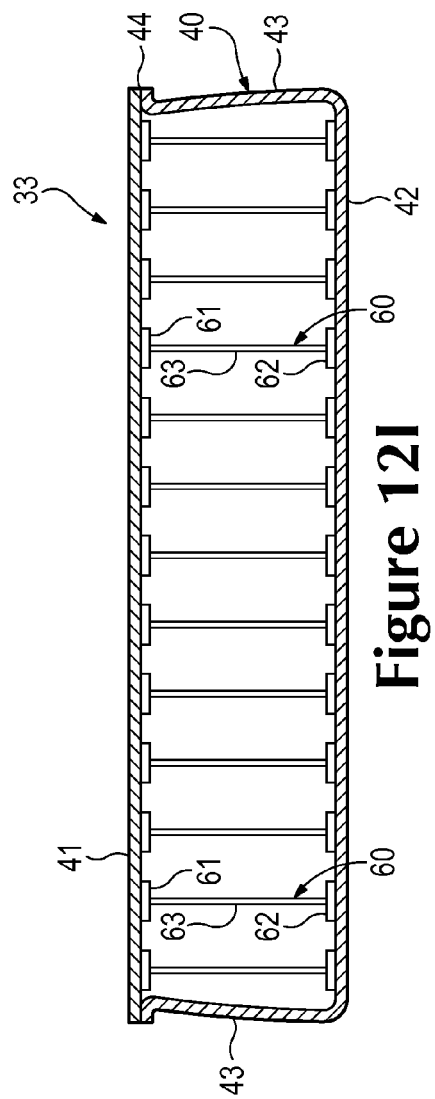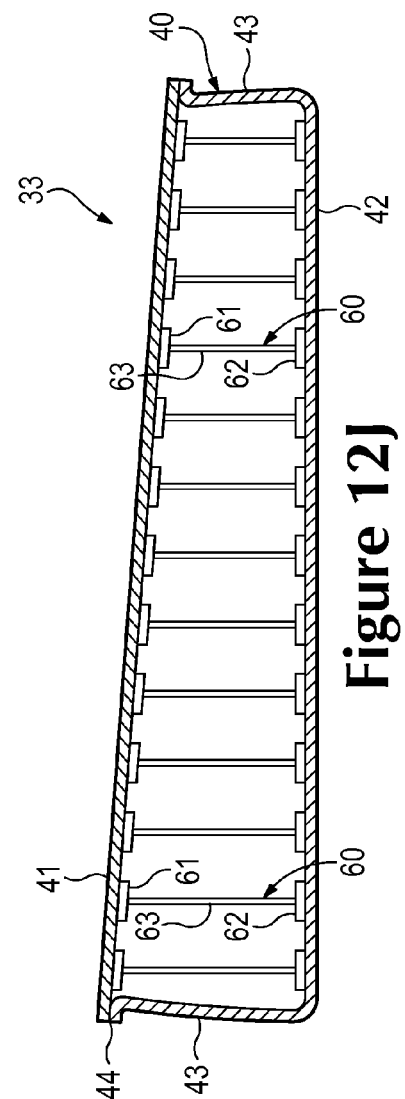

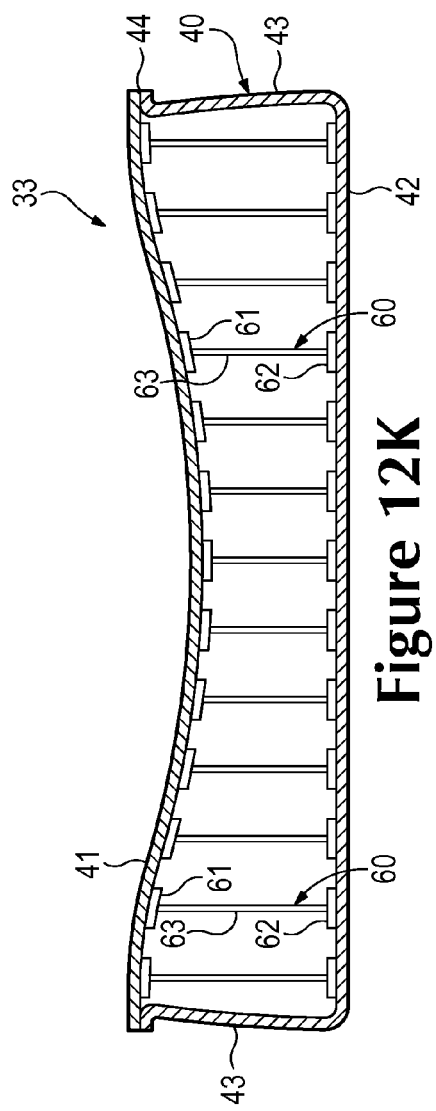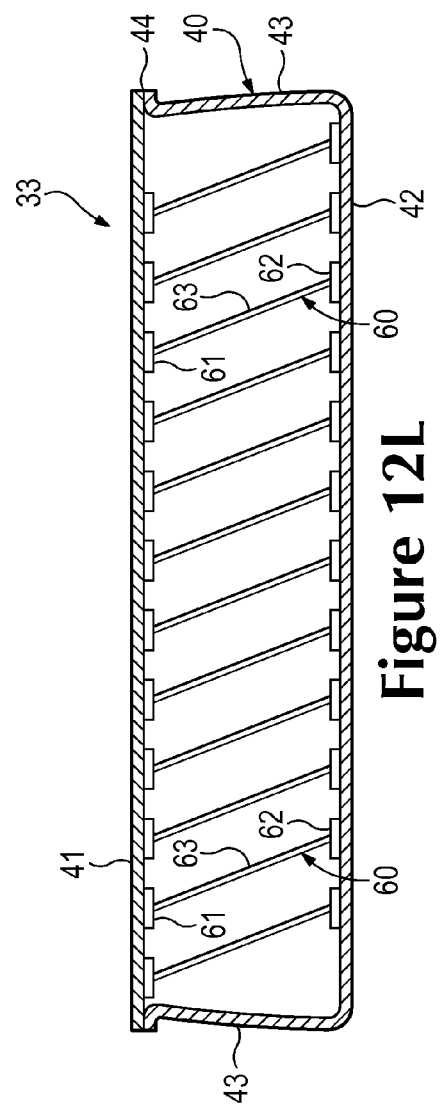

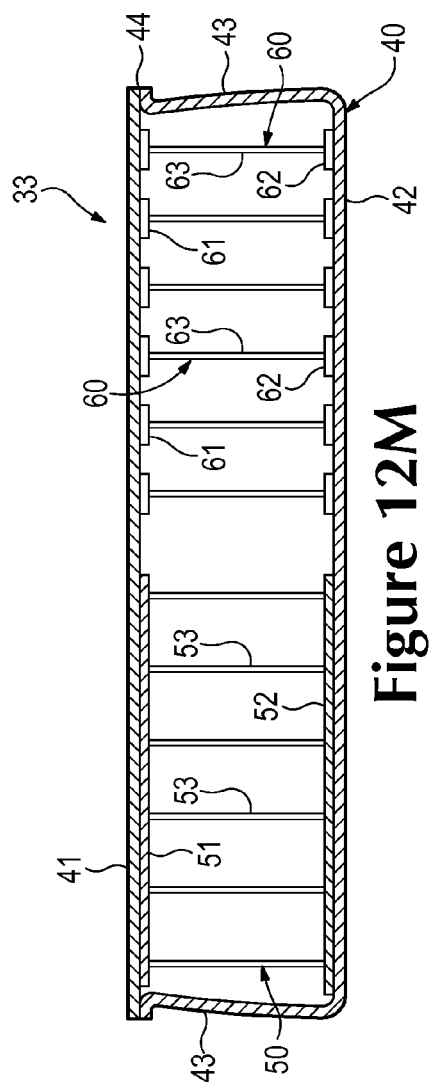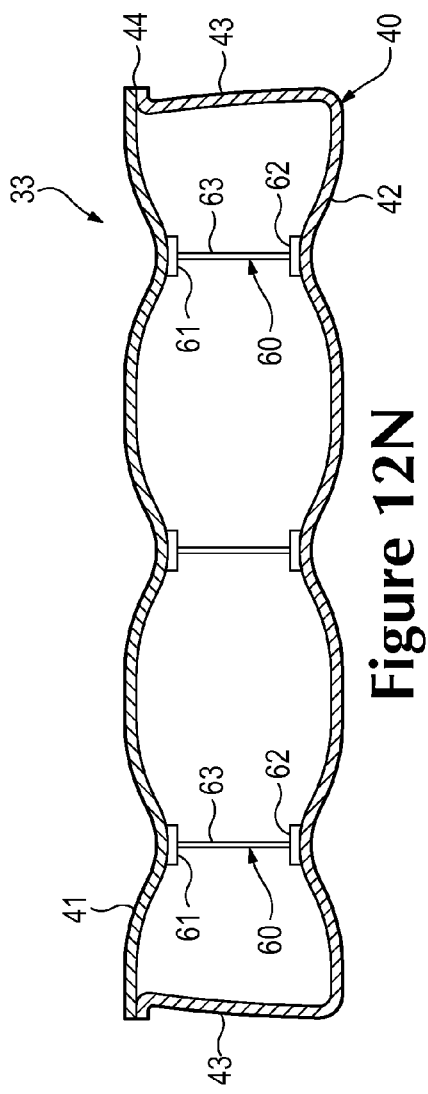

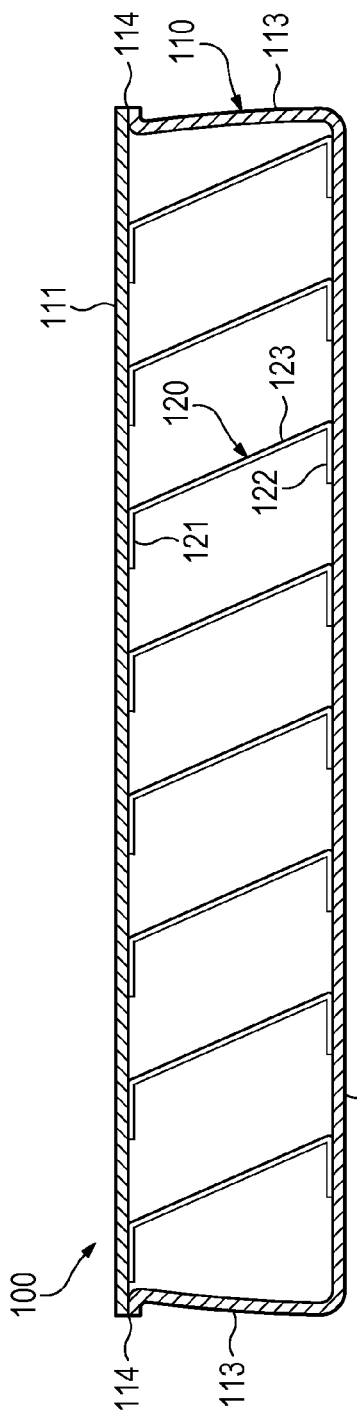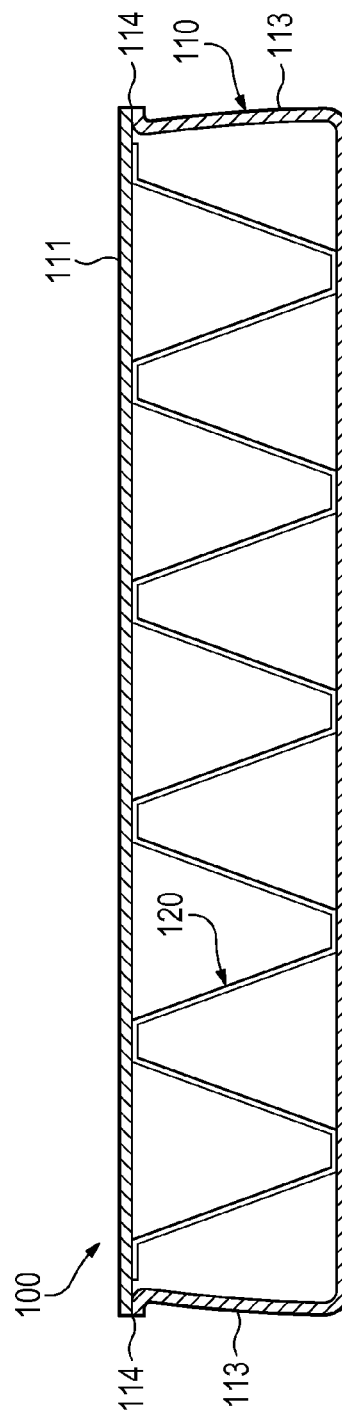

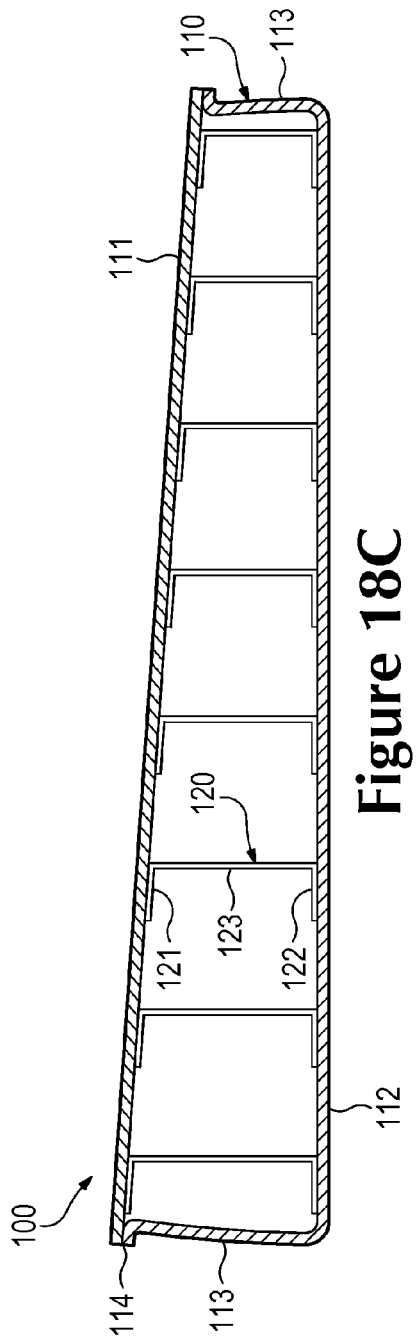
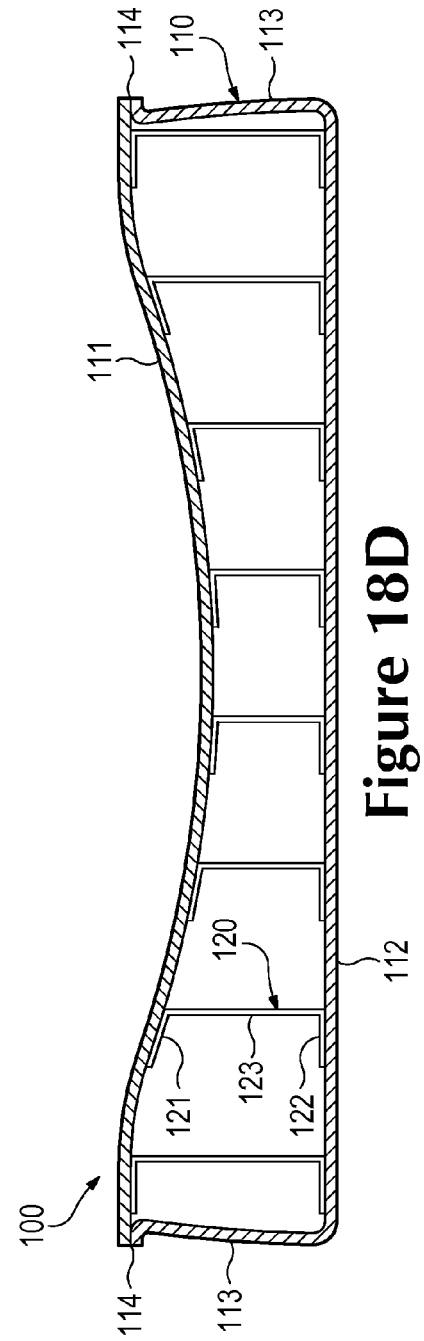

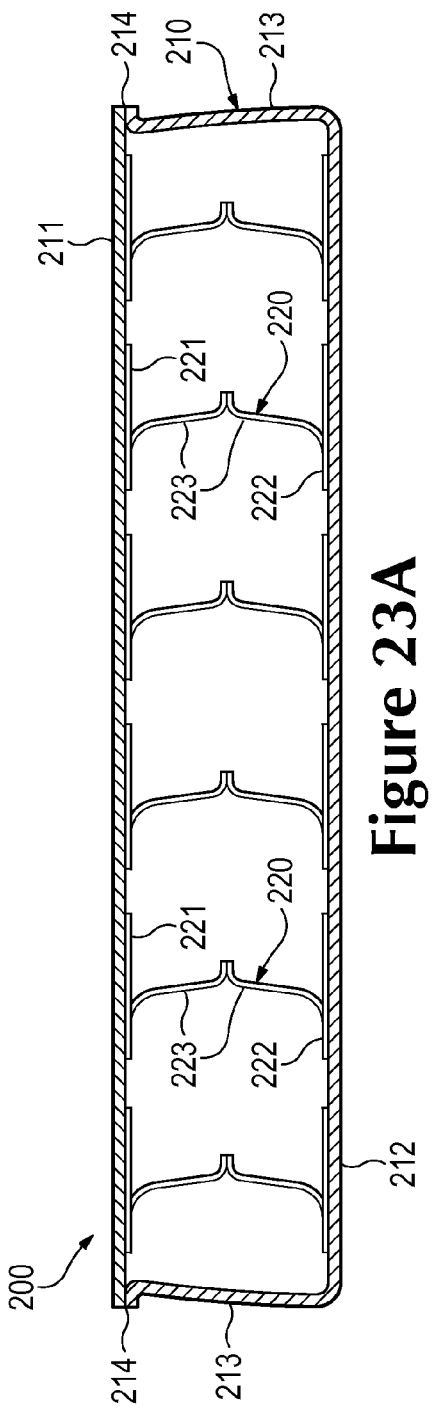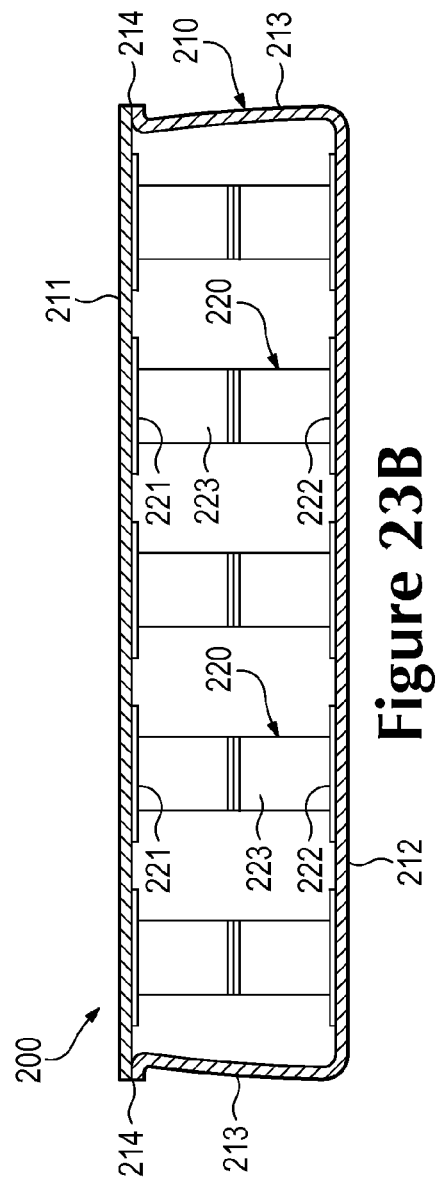
Figure 23A
Figure 23B

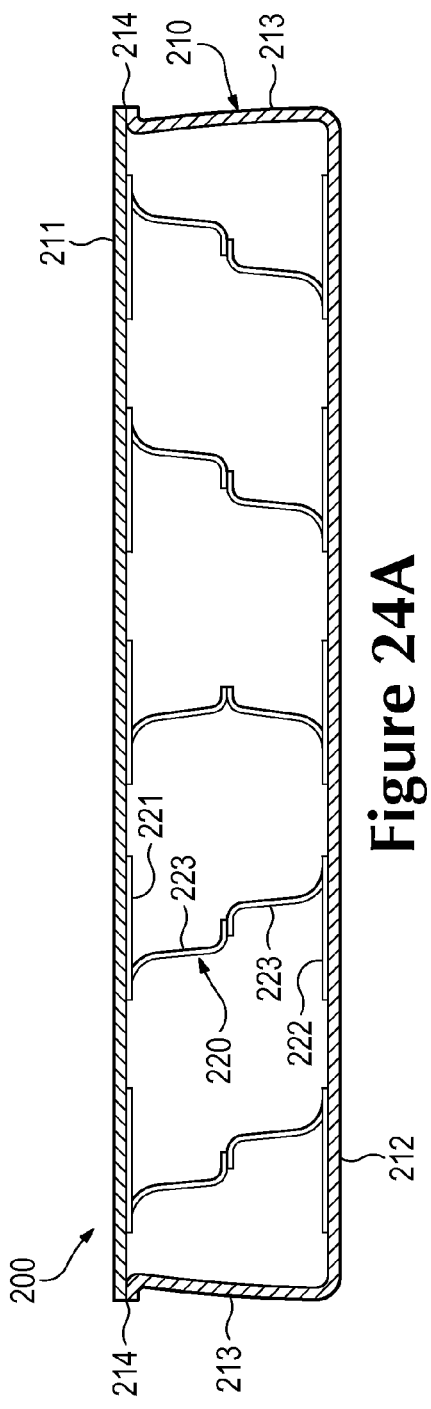
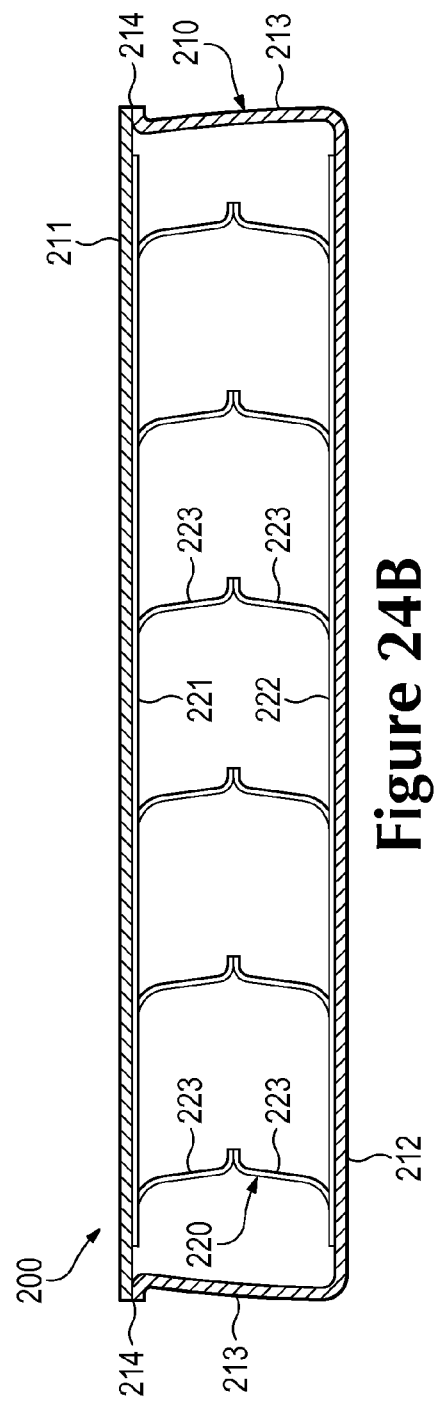

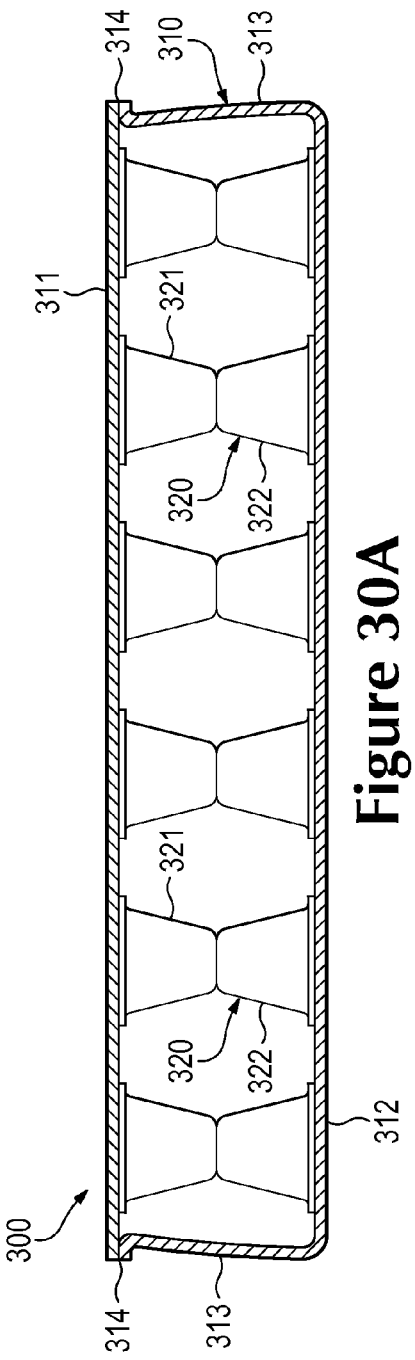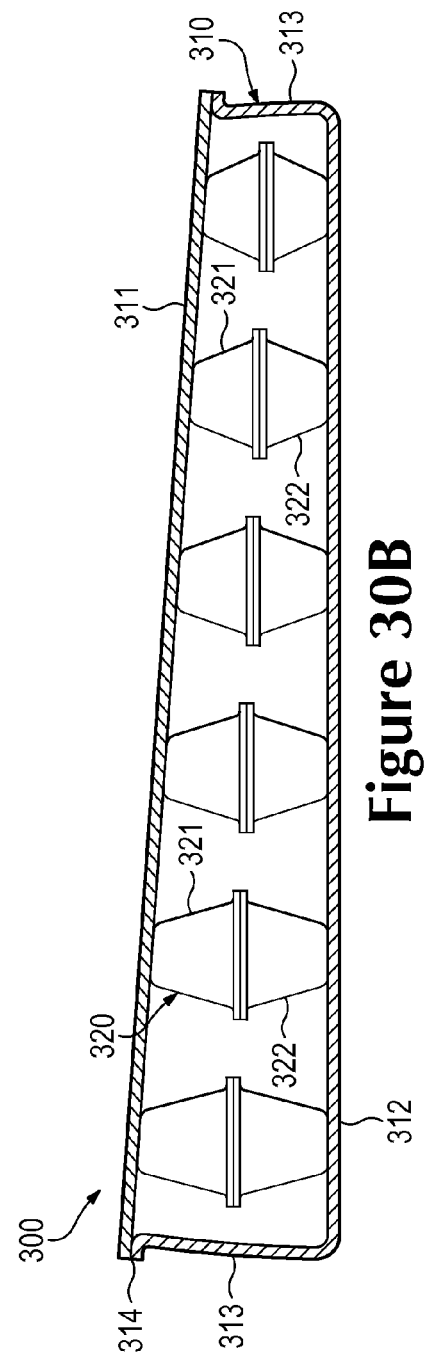

TETHERED FLUID-FILLED CHAMBERS

CROSS-REFERENCE TO RELATED APPLICATION

This application is a divisional of prior pending nonprovisional application Ser. No. 12/630,642, filed Dec. 3, 2009, the entire disclosure of which is incorporated herein by reference.

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. More particularly, the upper generally extends over the instep and toe areas of the foot, along the medial and lateral sides of the foot, under the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and outsole, embedded within the midsole, or encapsulated by the foamed polymer material of the midsole, for example. Although many conventional midsoles are primarily formed from a foamed polymer material, fluid-filled chambers or other non-foam structures may form a majority of some midsole configurations.

SUMMARY

An article of footwear is disclosed below as having an upper and a sole structure secured to the upper. At least one of the upper and the sole structure incorporates a chamber with an outer barrier and a tether element. The barrier is formed from a polymer material that defines an interior cavity, and the barrier has (a) a first portion that forms a first surface of the chamber and (b) a second portion that forms an opposite second surface of the chamber. The tether element is located within the interior cavity and joined to the first portion and the second portion. In some configurations, the tether element may extend across the interior cavity and is placed in tension by the outward force of a pressurized fluid within the interior cavity, thereby preventing the barrier from expanding outward and retaining the intended shape of the chamber.

The tether element may have a variety of configurations. For example, the tether element may be joined to offset areas of the first portion and the second portion of the barrier to impart a diagonal orientation. As another example, a first tether element and a second tether element may have different lengths, which may impart contour to the chamber. A tether element may also have a first plate or tie piece secured to the first portion of the barrier, a second plate or tie piece secured to the second portion of the barrier, and either one tether or a plurality of tethers joined to the first plate and the second plate and extending between the first plate and the second plate (i.e., across the interior cavity). In some configurations, the tether element may include a first sheet or layer secured to the first portion of the barrier, a second sheet or layer secured to the second portion of the barrier, and the first sheet and the second sheet contacting and being joined to each other.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 10A and 10B are cross-sectional views corresponding with FIG. 8B and depicting a force acting upon the first chamber.

FIGS. 18A-18D are cross-sectional views corresponding with FIG. 17A and depicting further configurations of the second chamber.

FIGS. 23A and 23B are cross-sectional views of the third chamber, as defined by section lines 23A and 23B in FIG. 19.

FIGS. 24A-24D are cross-sectional views corresponding with FIG. 23A and depicting further configurations of the third chamber.

FIGS. 30A-30C are cross-sectional views corresponding with FIG. 29A and depicting further configurations of the fourth chamber.

DETAILED DESCRIPTION

The following discussion and accompanying figures disclose an article of footwear, as well as various fluid-filled chambers that may be incorporated into the footwear. Concepts related to the chambers are disclosed with reference to footwear that is suitable for running. The chambers are not limited to footwear designed for running, however, and may be utilized with a wide range of athletic footwear styles, including basketball shoes, cross-training shoes, cycling shoes, football shoes, soccer shoes, tennis shoes, and walking shoes, for example. The chambers may also be utilized with footwear styles that are generally considered to be non-athletic, including dress shoes, loafers, sandals, and boots. The concepts disclosed herein may, therefore, apply to a wide variety of footwear styles, in addition to the specific style discussed in the following material and depicted in the accompanying figures. The chambers may also be utilized with a variety of other products, including backpack straps, mats for yoga, seat cushions, and protective apparel, for example.

General Footwear Structure

Figure 1:
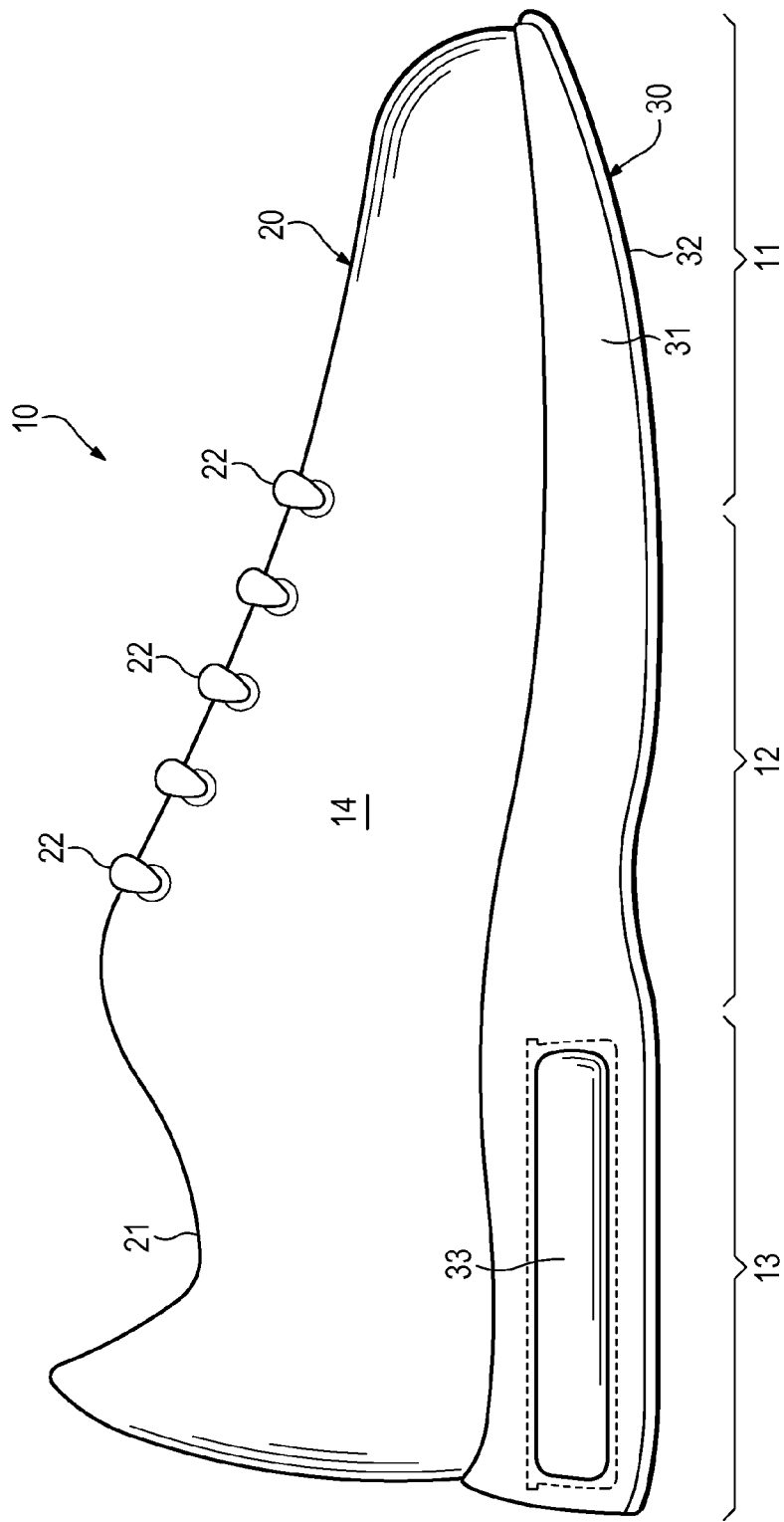
FIG. 1 is a lateral side elevational view of an article of footwear.
Figure 2:
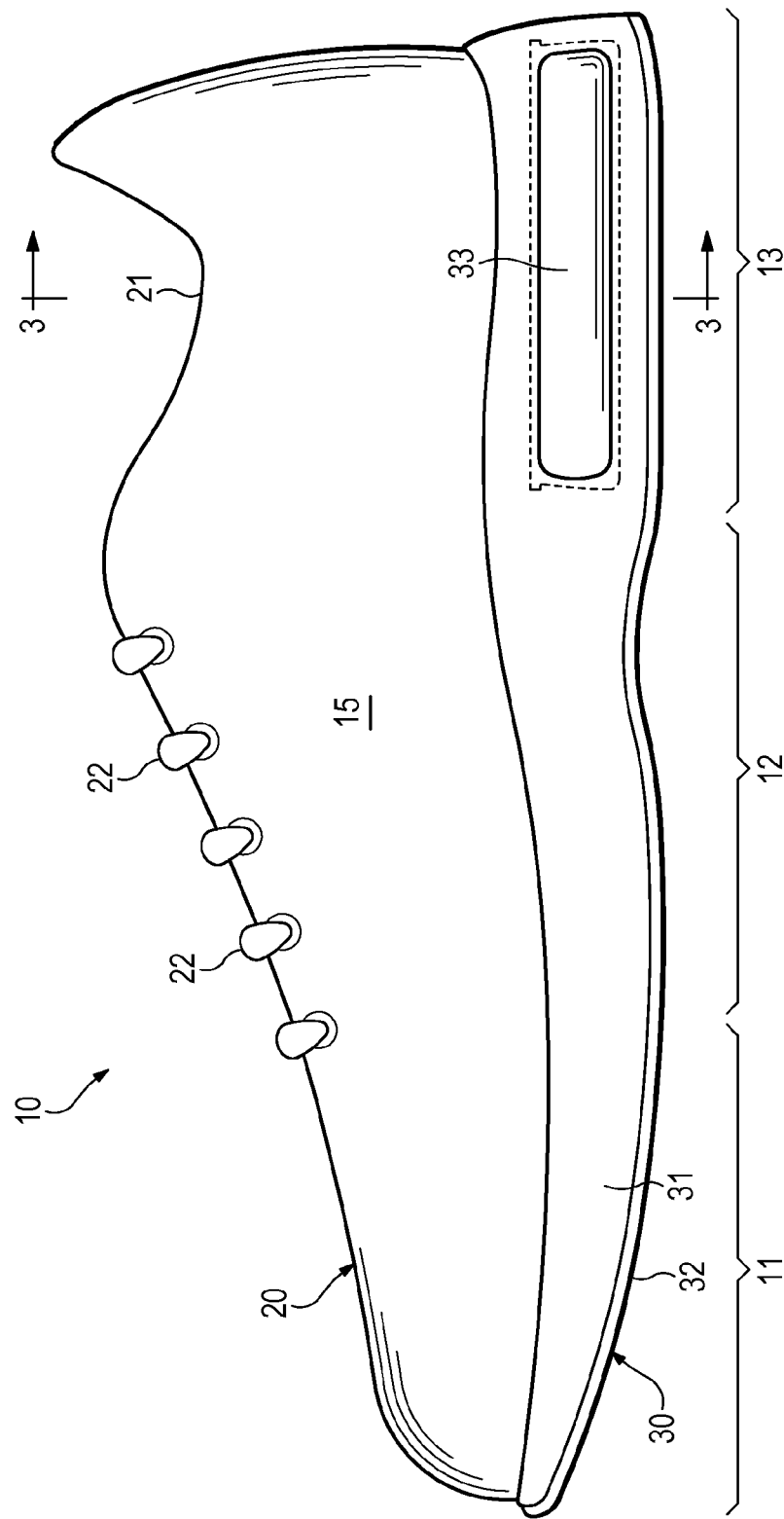
FIG. 2 is a medial side elevational view of the article of footwear.
Figure 3:
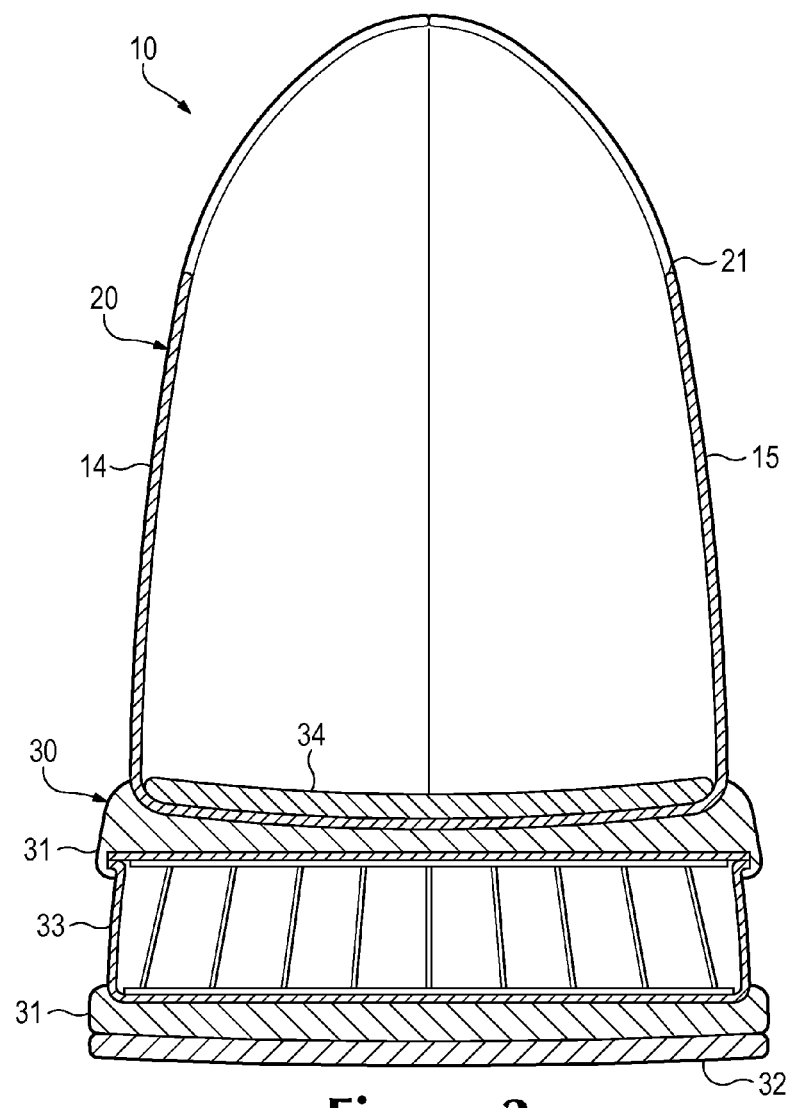
FIG. 3 is a cross-sectional view of the article of footwear, as defined by section line 3-3 in FIG. 2.
Figure 4:
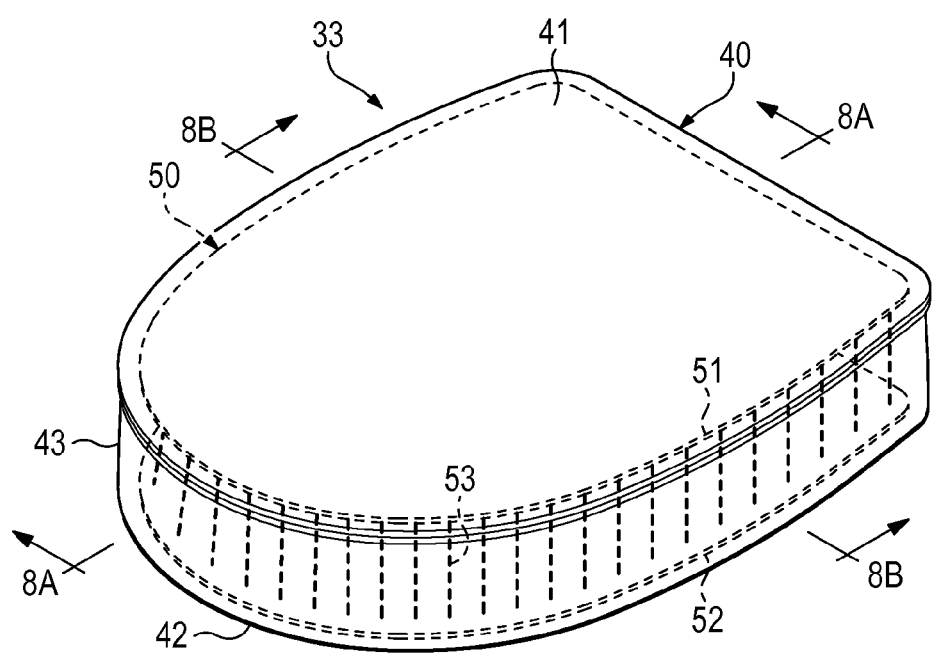
FIG. 4 is a perspective view of a first chamber from the article of footwear.
Figure 5:
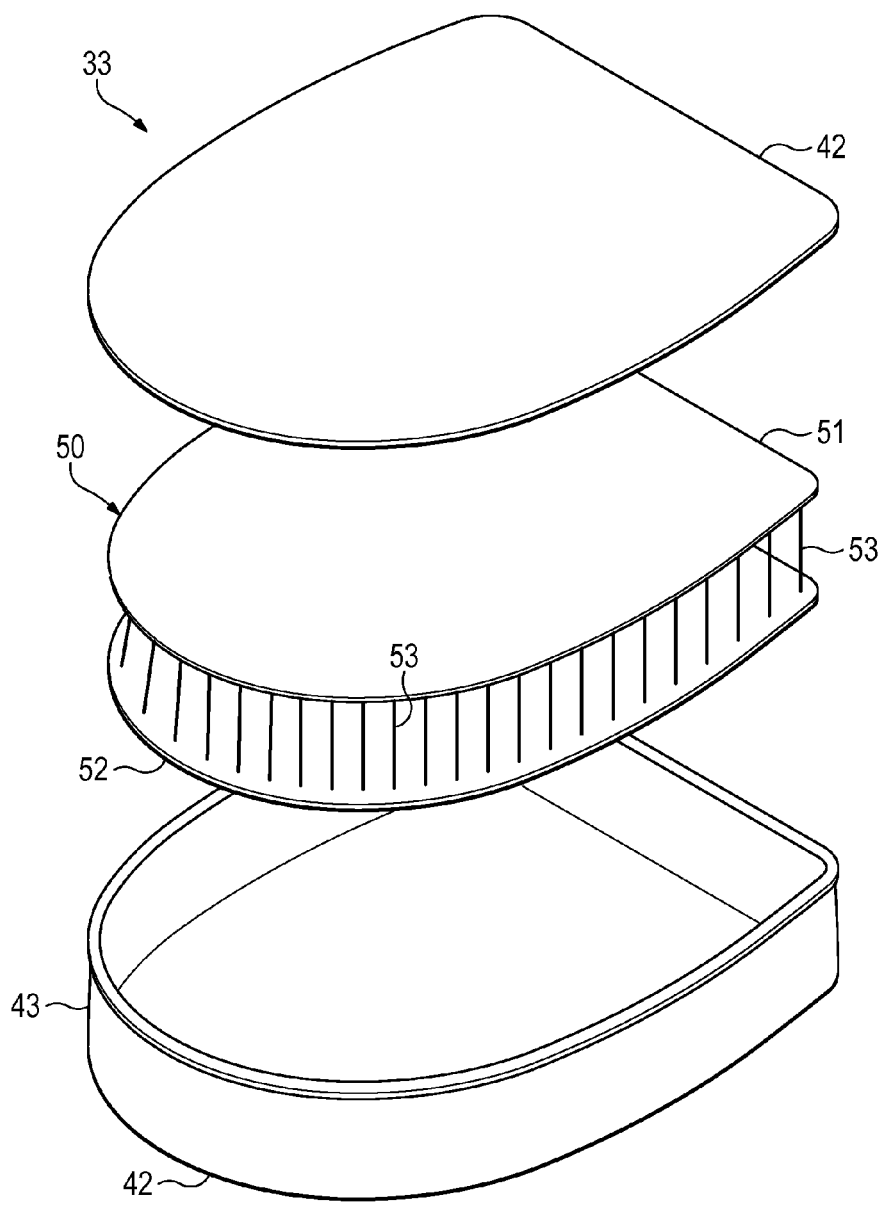
FIG. 5 is an exploded perspective view of the first chamber.
Figure 6:
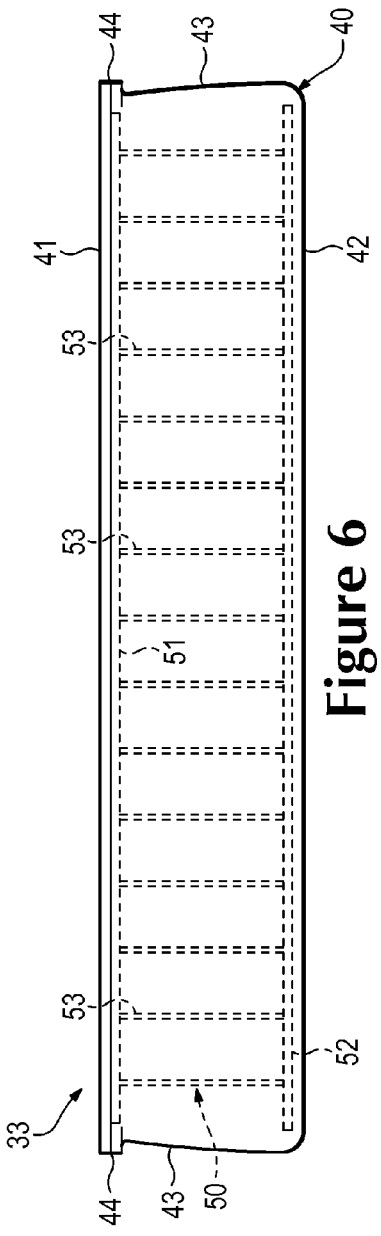
FIG. 6 is a side elevational view of the first chamber.
Figure 7:
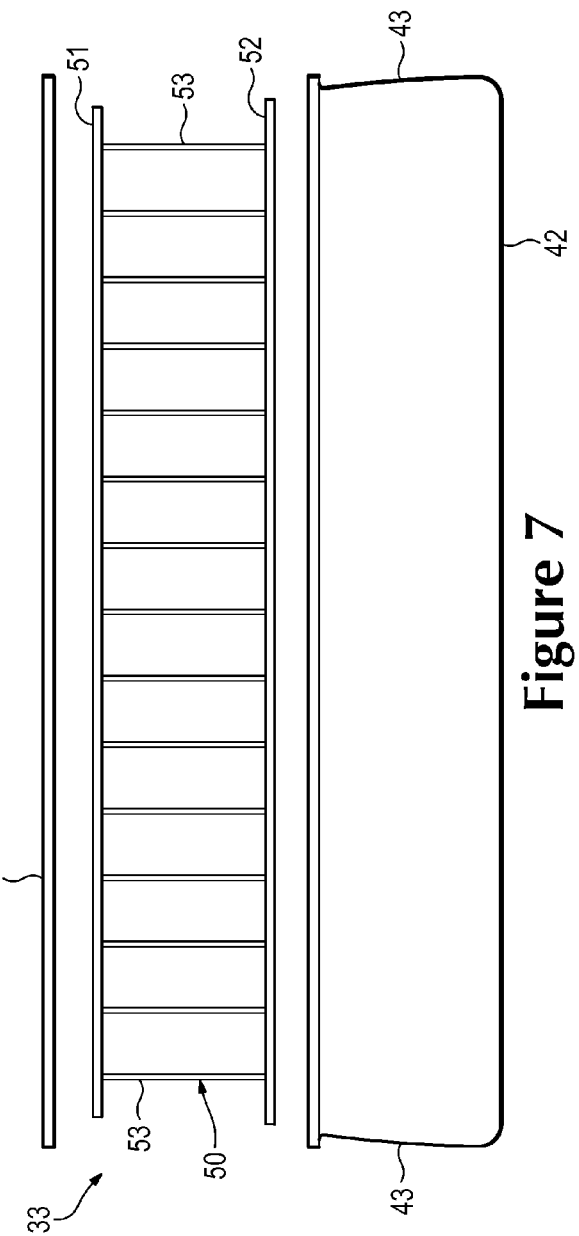
FIG. 7 is an exploded side elevational view of the first chamber.

An article of footwear 10 is depicted in FIGS. 1-3 as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality material elements (e.g., textiles, foam, leather, and synthetic leather) that are stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present discussion primarily relate to sole structure 30, upper 20 may exhibit the general configuration discussed above or the general configuration of practically any other conventional or non-conventional upper. Accordingly, the structure of upper 20 may vary significantly within the scope of the present invention.

Sole structure 30 is secured to upper 20 and has a configuration that extends between upper 20 and the ground. In addition to attenuating ground reaction forces (i.e., providing cushioning for the foot), sole structure 30 may provide traction, impart stability, and limit various foot motions, such as pronation. The primary elements of sole structure 30 are a midsole element 31, an outsole 32, and a chamber 33. Midsole element 31 is secured to a lower area of upper 20 and may be formed from various polymer foam materials (e.g., polyurethane or ethylvinylacetate foam) that extend through each of regions 11-13 and between sides 14 and 15. Additionally, midsole element 31 at least partially envelops or receives chamber 33, which will be discussed in greater detail below. Outsole 32 is secured to a lower surface of midsole element 31 and may be formed from a textured, durable, and wear-resistant material (e.g., rubber) that forms the ground-contacting portion of footwear 10. In addition to midsole element 31, outsole 32, and chamber 33, sole structure 30 may incorporate one or more support members, moderators, or reinforcing structures, for example, that further enhance the ground reaction force attenuation characteristics of sole structure 30 or the performance properties of footwear 10. Sole structure 30 may also incorporate a sockliner 34, as depicted in FIG. 3, that is located within a lower portion of the void in upper 20 and is positioned to contact a plantar (i.e., lower) surface of the foot to enhance the comfort of footwear 10.

When incorporated into sole structure 30, chamber 33 has a shape that fits within a perimeter of midsole element 31 and extends through heel region 13, extends into midfoot region 12, and also extends from lateral side 14 to medial side 15. Although chamber 33 is depicted as being exposed through the polymer foam material of midsole element 31, chamber 33 may be entirely encapsulated within midsole element 31 in some configurations of footwear 10. When the foot is located within upper 20, chamber 33 extends under a heel area of the foot in order to attenuate ground reaction forces that are generated when sole structure 30 is compressed between the foot and the ground during various ambulatory activities, such as running and walking. In some configurations, chamber 33 may protrude outward from midsole element 31 or may extend further into midfoot region 12 and may also extend forward to forefoot region 11. Accordingly, the shape and dimensions of chamber 33 may vary significantly to extend through various areas of footwear 10. Moreover, any of a variety of other chambers 100, 200, and 300 (disclosed in greater detail below) may be utilized in place of chamber 33 in footwear 10.

First Chamber Configuration

The primary components of chamber 33, which is depicted individually in FIGS. 4-8B, are a barrier 40 and a tether element 50. Barrier 40 forms an exterior of chamber 33 and (a) defines an interior cavity that receives both a pressurized fluid and tether element 50 and (b) provides a durable sealed barrier for retaining the pressurized fluid within chamber 33. The polymer material of barrier 40 includes a first or upper barrier portion 41, an opposite second or lower barrier portion 42, and a sidewall barrier portion 43 that extends around a periphery of chamber 33 and between barrier portions 41 and 42. Tether element 50 is located within the interior cavity and has a configuration that includes a first or upper plate 51, an opposite second or lower plate 52, and a plurality of tethers 53 that extend between plates 51 and 52. Whereas upper plate 51 is secured to an inner surface of upper barrier portion 41, lower plate 52 is secured to an inner surface of lower barrier portion 42. Either adhesive bonding or thermobonding, for example, may be utilized to secure tether element 50 to barrier 40.

In manufacturing chamber 33, a pair of polymer sheets may be molded and bonded during a thermoforming process to define barrier portions 41-43. More particularly, the thermoforming process (a) imparts shape to one of the polymer sheets in order to form upper barrier portion 41, (b) imparts shape to the other of the polymer sheets in order to form lower barrier portion 42 and sidewall barrier portion 43, and (c) forms a peripheral bond 44 that joins a periphery of the polymer sheets and extends around an upper area of sidewall barrier portion 43. The thermoforming process may also locate tether element 50 within chamber 33 and bond tether element 50 to each of barrier portions 41 and 42. Although substantially all of the thermoforming process may be performed with a mold, each of the various parts of the process may be performed separately in forming chamber 33. Other processes that utilize blowmolding, rotational molding, or the bonding of polymer sheets without thermoforming may also be utilized to manufacture chamber 33.

Following the thermoforming process, a fluid may be injected into the interior cavity and pressurized. The pressurized fluid exerts an outward force upon barrier 40 and plates 51 and 52, which tends to separate barrier portions 41 and 42. Tether element 50, however, is secured to each of barrier portions 41 and 42 in order to retain the intended shape of chamber 33 when pressurized. More particularly, tethers 53 extend across the interior cavity and are placed in tension by the outward force of the pressurized fluid upon barrier 40, thereby preventing barrier 40 from expanding outward and retaining the intended shape of chamber 33. Whereas peripheral bond 44 joins the polymer sheets to form a seal that prevents the fluid from escaping, tether element 50 prevents chamber 33 from expanding outward or otherwise distending due to the pressure of the fluid. That is, tether element 50 effectively limits the expansion of chamber 33 to retain an intended shape of surfaces of barrier portions 41 and 42.

The fluid within chamber 33 may be pressurized between zero and three-hundred-fifty kilopascals (i.e., approximately fifty-one pounds per square inch) or more. In addition to air and nitrogen, the fluid may include any of the gasses disclosed in U.S. Pat. No. 4,340,626 to Rudy. In some configurations, chamber 33 may incorporate a valve or other structure that permits the wearer or another individual to adjust the pressure of the fluid.

A wide range of polymer materials may be utilized for barrier 40. In selecting materials for barrier 40, engineering properties of the material (e.g., tensile strength, stretch properties, fatigue characteristics, dynamic modulus, and loss tangent) as well as the ability of the material to prevent the diffusion of the fluid contained by barrier 40 may be considered. When formed of thermoplastic urethane, for example, barrier 40 may have a thickness of approximately 1.0 millimeter, but the thickness may range from 0.25 to 4.0 millimeters or more, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

As discussed above, tether element 50 includes upper plate 51, the opposite lower plate 52, and the plurality of tethers 53 that extend between plates 51 and 52. Each of plates 51 and 52 have a generally continuous and planar configuration. Tethers 53 are secured to each of plates 51 and 52 and space plates 51 and 52 apart from each other. More particularly, the outward force of the pressurized fluid places tethers 53 in tension and restrains further outward movement of plates 51 and 52 and barrier portions 41 and 42.

Figure 8A:
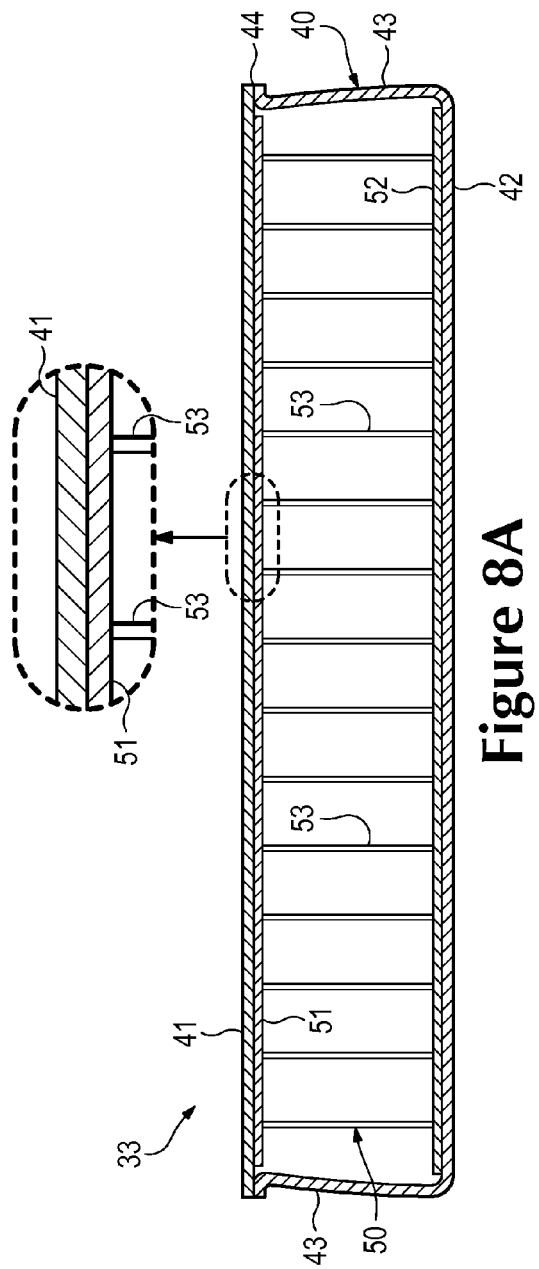
FIGS. 8A and 8B are cross-sectional views of the first chamber, as defined by section lines 8A and 8B in FIG. 4.
Figure 8B:
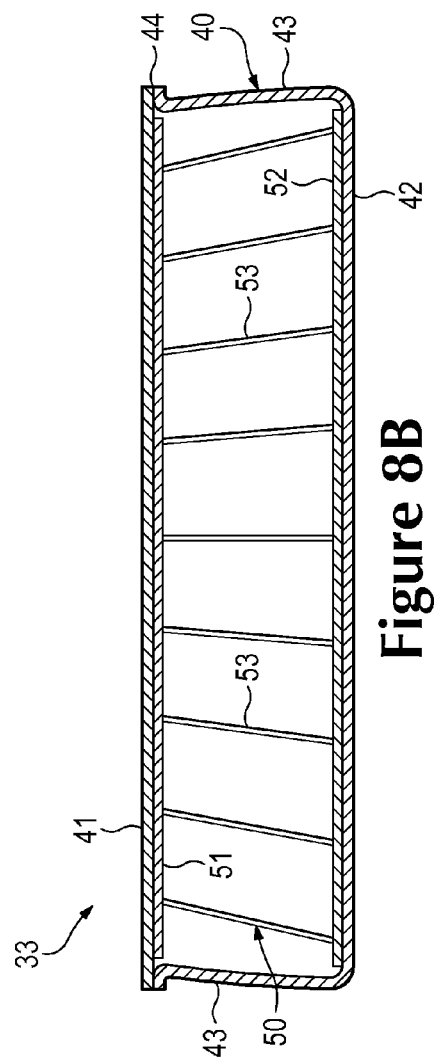

Plates 51 and 52 impart a particular shape and contour to the upper and lower surfaces of chamber 33. Given that plates 51 and 52 exhibit a planar configuration, the upper and lower surfaces of chamber 33 exhibit a corresponding planar configuration. As discussed in greater detail below, however, one or both of plates 51 and 52 may be contoured to impart a contoured configuration to surfaces of chamber 33. Although plates 51 and 52 may extend across substantially all of the length and width of chamber 33, plates 51 and 52 are depicted in FIGS. 8A and 8B as being spaced inward from sidewall barrier portion 43. That is, plates 51 and 52 are depicted as only extending across a portion of the length and width of chamber 33. In this configuration, upper plate 51 extends adjacent to at least fifty percent of upper barrier portion 41, and lower plate 52 extends adjacent to at least fifty percent of lower barrier portion 42. Without tether element 50, chamber 33 would effectively bulge or otherwise distend to a generally rounded shape. Plates 51 and 52, however, retain an intended shape in barrier portions 41 and 42, and tethers 53 limit the degree to which plates 51 and 52 may separate. Given that areas where plates 51 and 52 are absent may bulge or distend outward, extending plates 51 and 52 adjacent to at least fifty percent of barrier portions 41 and 42 ensures that central areas of barrier portions 41 and 42 remain properly shaped. Although peripheral areas of barrier portions 41 and 42 may protrude outward due to the absence of plates 51 and 52, forming chamber 33 such that plates 51 and 52 extend adjacent to at least fifty percent of barrier portions 41 and 42 ensures that chamber 33 remains suitably-shaped for use in footwear 10.

Figure 9A:
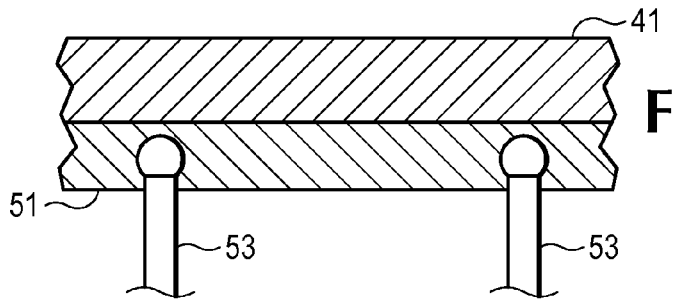
FIGS. 9A-9D are partial cross-sectional views corresponding with an enlarged area in FIG. 8A and depicting further configurations of the first chamber.
Figure 9B:
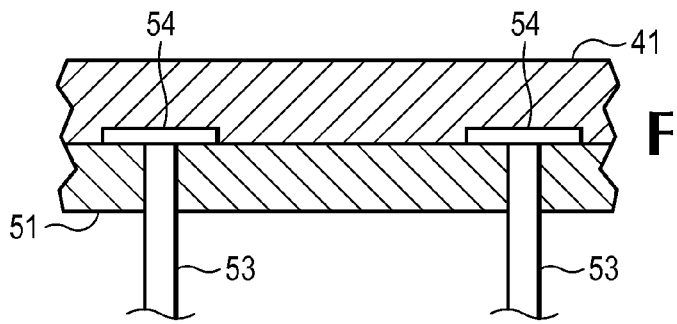
Figure 9C:
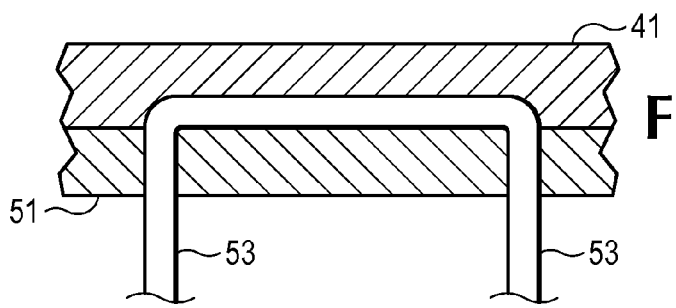
Figure 9D:
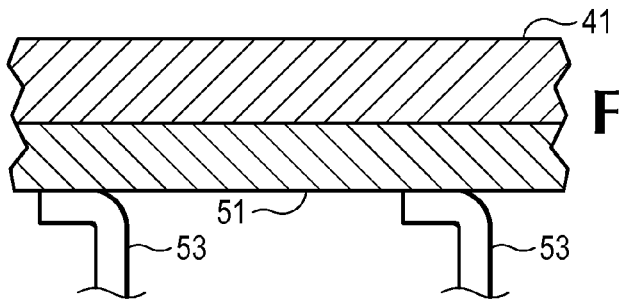

A variety of structures may be utilized to secure tethers 53 to each of plates 51 and 52. As depicted in an enlarged area of FIG. 8A, for example, tethers 53 are merely secured to upper plate 51, and a similar configuration may be utilized to join tethers 53 to lower plate 52. A variety of securing structures may also be utilized. Referring to FIG. 9A, ends of tethers 53 include enlarged areas that may assist with anchoring tethers 53 within upper plate 51. FIG. 9B depicts a configuration wherein each of tethers 53 are secured to a restraint 54 located on an upper surface of upper plate 51 (i.e., between upper plate 51 and upper barrier portion 41). Each of restraints 54 may have the configuration of a disk that is joined to an end of one of tethers 53. In another configuration, as depicted in FIG. 9C, a single tether 53 extends through upper plate 51 in two locations and runs along the upper surface of upper plate 51. The various tethers 53 may, therefore, be formed from a single strand or other element that repeatedly passes through plates 51 and 52. As another example, individual tethers 53 may be secured to a lower surface of upper plate 51, as depicted in FIG. 9D, with an adhesive or thermobonding. Accordingly, tethers 51 may be secured to plates 51 and 52 in a variety of ways.

Plates 51 and 52 may be formed from a variety of materials, including various polymer materials, composite materials, and metals. More particularly, plates 51 and 52 may be formed from polyethylene, polypropylene, thermoplastic polyurethane, polyether block amide, nylon, and blends of these materials. Composite materials may also be formed by incorporating glass fibers or carbon fibers into the polymer materials discussed above in order to enhance the overall strength of tether element 50. In some configurations of chamber 33, plates 51 and 52 may also be formed from aluminum, titanium, or steel. Although plates 51 and 52 may be formed from the same materials (e.g., a composite of polyurethane and carbon fibers), plates 51 and 52 may be formed from different materials (e.g., a composite and aluminum, or polyurethane and polyethylene). As a related matter, the material forming barrier 40 generally has lesser stiffness than plates 51 and 52. Whereas the foot may compress barrier 40 during walking, running, or other ambulatory activities, plates 51 and 52 may remain more rigid and less flexible when the material forming plates 51 and 52 generally has greater stiffness than the material forming barrier 40.

Tethers 53 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable materials for tethers 53 include various strands, filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, and steel. Whereas filaments have an indefinite length and may be utilized individually as tethers 53, fibers have a relatively short length and generally go through spinning or twisting processes to produce a strand of suitable length. An individual filament utilized in tethers 53 may be formed form a single material (i.e., a monocomponent filament) or from multiple materials (i.e., a bicomponent filament). Similarly, different filaments may be formed from different materials. As an example, yarns utilized as tethers 53 may include filaments that are each formed from a common material, may include filaments that are each formed from two or more different materials, or may include filaments that are each formed from two or more different materials. Similar concepts also apply to threads, cables, or ropes. The thickness of tethers 53 may also vary significantly to range from 0.03 millimeters to more than 5 millimeters, for example. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material.

Tethers 53 are arranged in rows that extend longitudinally along the lengths of plate 51 and 52. Referring to FIG. 8B, nine tethers 53 extend across the width of chamber 33, and each of the nine tethers are within one of the longitudinally-extending rows. Whereas the central row of tethers 53 is oriented to have a generally vertical orientation, the more peripheral rows of tethers 53 are oriented diagonally. That is, tethers 53 may be secured to offset areas of plates 51 and 52 in order to induce the diagonal orientation. An advantage of the diagonal orientation of tethers 53 relates to the stability of footwear 10. Referring to FIG. 10A, a force 16 is shown as compressing sole structure 30 and thrusting toward lateral side 14, which may correspond to a cutting motion that is utilized in many athletic activities to move an individual side-to-side. When force 16 deforms chamber 33 in this manner, tethers 53 adjacent to medial side 15 are placed in tension due to their sloping or diagonal orientation, as represented by various arrows 17. The tension in tethers 53 adjacent to medial side 15 resists the deformation of chamber 33, thereby resisting the collapse of lateral side 14. Similarly, referring to FIG. 10B, force 16 is shown as compressing sole structure 30 and thrusting toward medial side 15, which may also correspond to a cutting motion. When force 16 deforms chamber 33 in this manner, tethers 53 adjacent to lateral side 14 are placed in tension due to their sloping or diagonal orientation, as represented by the various arrows 17. The tension in tethers 53 adjacent to lateral side 14 resists the deformation of chamber 33, thereby resisting the collapse of medial side 15. Accordingly, the diagonal orientation of tethers 53 resists deformation in chamber 33, thereby enhancing the overall stability of footwear 10 during walking, running, or other ambulatory activities.

Figure 11A:
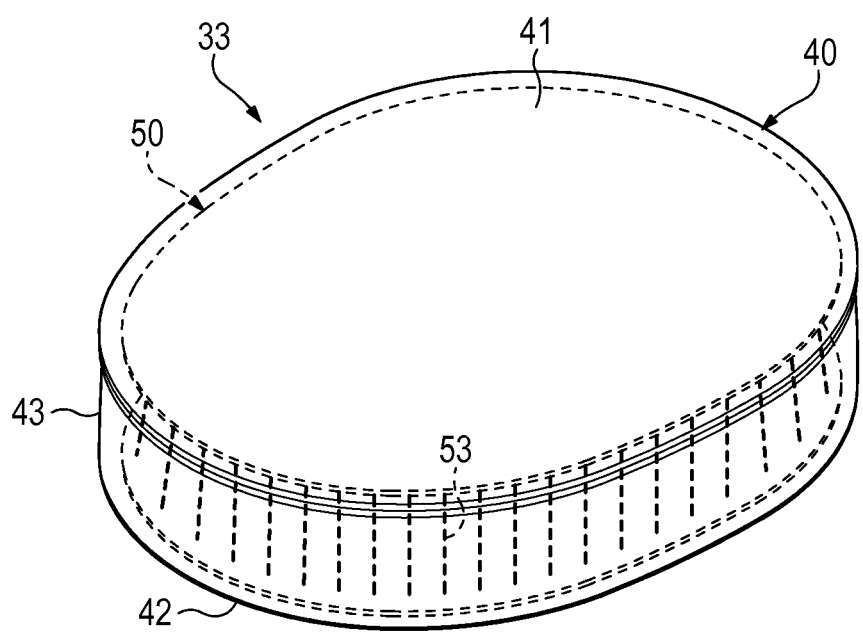
FIGS. 11A-11C are perspective views depicting further configurations of the first chamber.
Figure 11B:
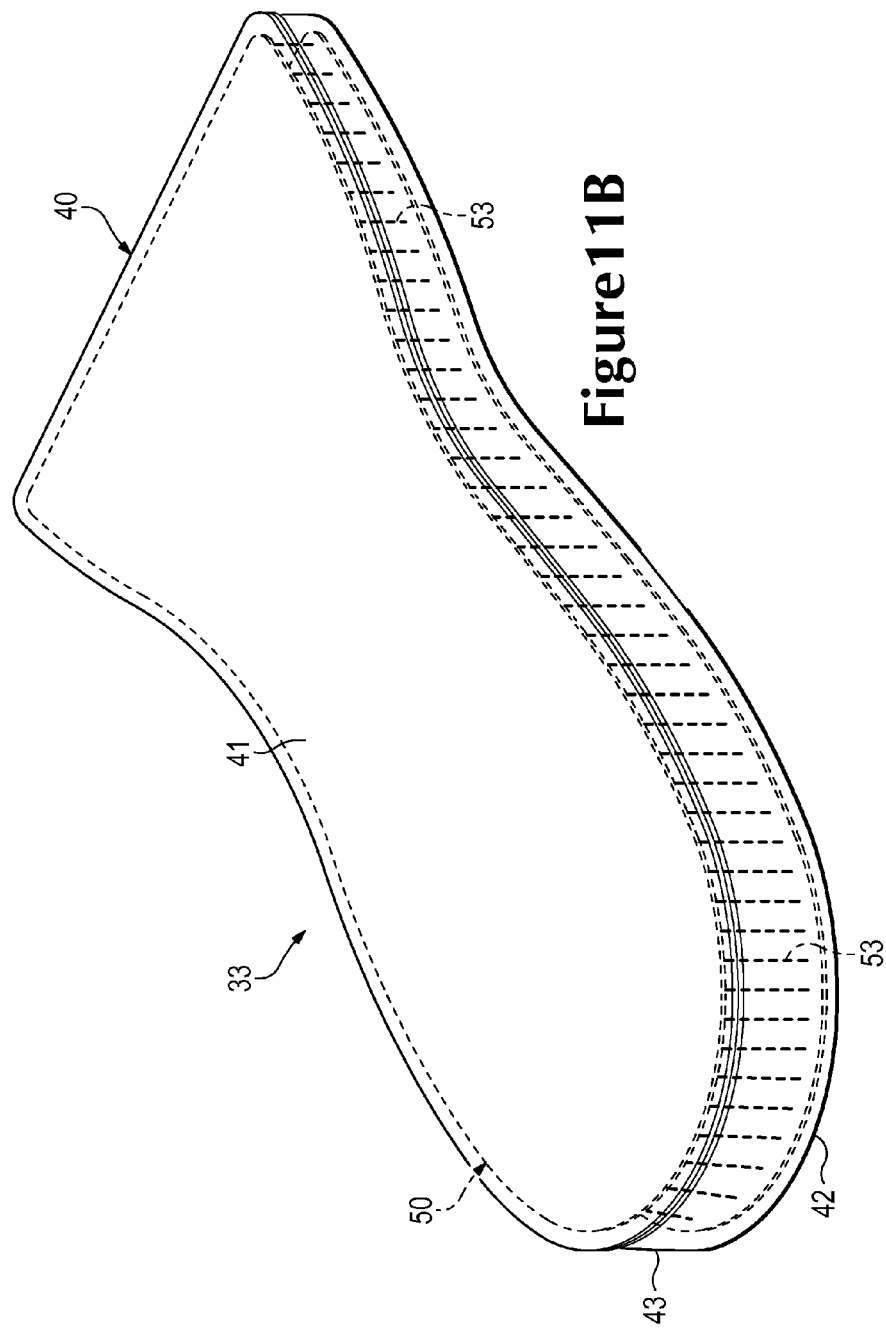
Figure 11C:
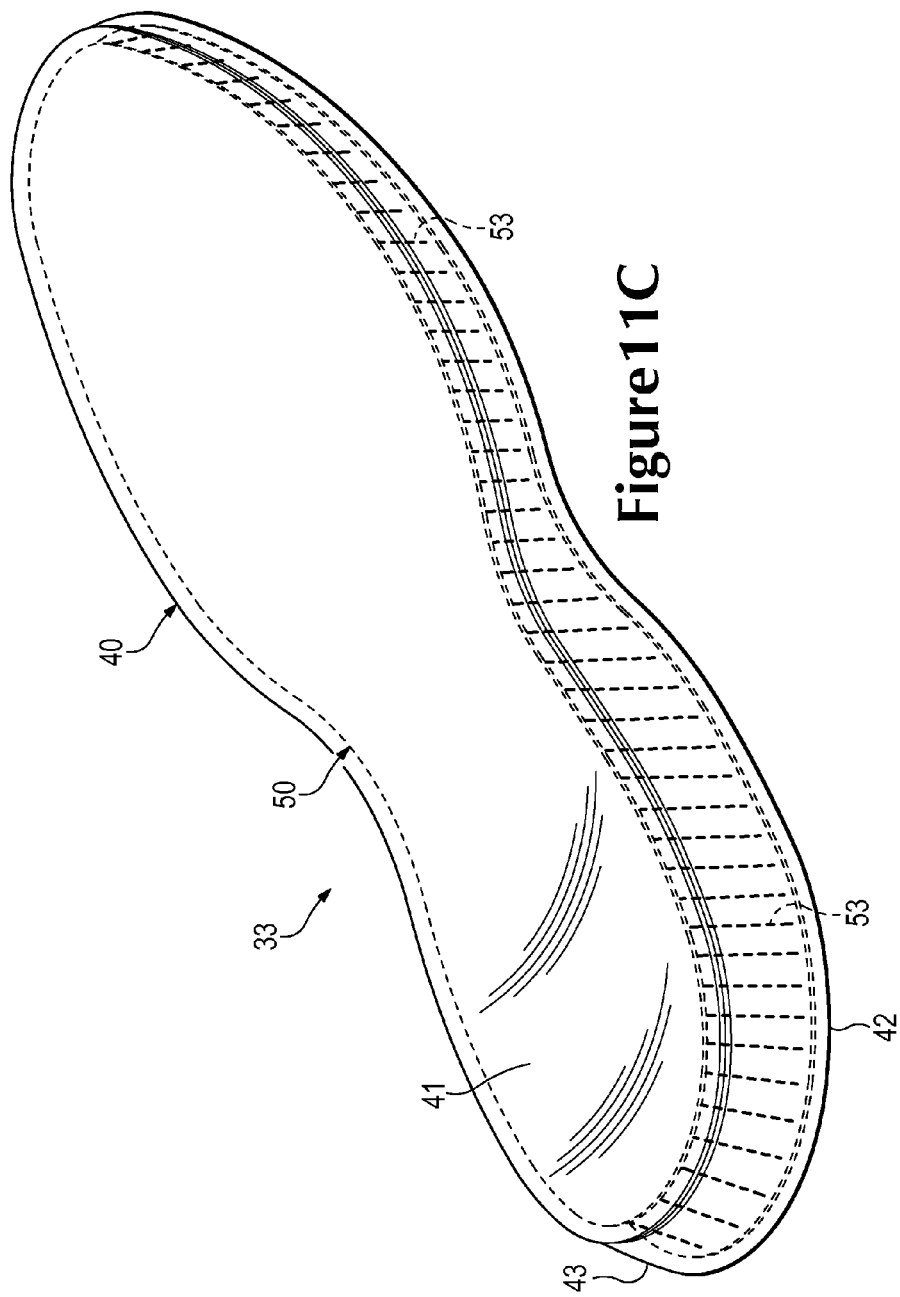

The overall shape of chamber 33 and the areas of footwear 10 in which chamber 33 is located may vary significantly. Referring to FIG. 11A, chamber 33 has a generally round configuration that may be located solely within heel region 13, for example. Another shape is depicted in FIG. 11B, wherein chamber 33 has a configuration that extends through both heel region 13 and midfoot region 12. In this configuration chamber 33 may replace midsole element 31 such that chamber 33 extends from lateral side 14 to medial side 15 and from upper 20 to outsole 32. A similar configuration is depicted in FIG. 11C, wherein chamber 33 has a shape that fits within a perimeter of sole structure 30 and extends under substantially all of the foot, thereby corresponding with a general outline of the foot. In this configuration chamber 33 may also replace midsole element 31 such that chamber 33 extends from lateral side 14 to medial side 15, from heel region 13 to forefoot region 11, and from upper 20 to outsole 32.

Although the structure of chamber 33 discussed above and depicted in the figures provides a suitable example of a configuration that may be utilized in footwear 10, a variety of other configurations may also be utilized. Referring to FIG. 12A, chamber 33 exhibits a tapered configuration. One manner of imparting the tapered configuration relates to the relative lengths of tethers 53. Whereas tethers 53 are relatively long in the areas of chamber 33 exhibiting greater thicknesses, tethers 53 are relatively short in the areas of chamber 33 exhibiting lesser thicknesses. By varying the lengths of tethers 53, therefore, tapers or other features may be incorporated into chamber 33. The taper in FIG. 12A extends from lateral side 14 to medial side 15. A taper may also extend from heel region 13 to forefoot region 12, as in the configuration of chamber 33 depicted in FIG. 11C. Another configuration of chamber 33 is depicted in FIG. 12B, wherein a central area of chamber 33 is depressed relative to the peripheral areas. More particularly, upper plate 51 is contoured to have a non-planar configuration, thereby forming a depression in the central area. When incorporated into footwear 10, the depression may correspond with the location of the heel of the wearer, thereby providing an area for securely-receiving the heel. A similar depression is also formed in the configuration of chamber 33 depicted in FIG. 11C. In other configurations, upper plate 51 may be contoured to form a protruding arch support area, for example. As a related matter, the relative lengths of tethers 53 vary throughout the configuration depicted in FIG. 12B. More particularly, tethers 53 in the peripheral areas have greater lengths than tethers 53 in the central area.

Various aspects relating to tethers 53 may also vary. Referring to FIG. 12C, each of tethers 53 exhibit a diagonal orientation. In some configurations, tethers 53 may cross each other to form x-shaped structures with opposing diagonal orientations, as depicted in FIG. 12D. Additionally, the spacing between adjacent tethers 53 may vary significantly, as depicted in FIG. 12E, and tethers 53 may be absent from some areas of chamber 33. While tethers 53 may be formed from any generally one-dimensional material, a variety of other materials or structures may be located between plates 51 and 52 to prevent barrier 40 from expanding outward and retain the intended shape of chamber 33. Referring to FIG. 12F, for example, a variety of other tethers are located between plates 51 and 51. More particularly, a fluid-filled member 55 and a foam member 56 are bonded to plates 51 and 52, both of which may resist tension and compression. A textile member 57 may also be utilized and may have the configuration of either a woven or knit textile. In some configurations, textile member 57 may be a spacer knit textile. A truss member 58 may also be utilized in chamber 33 and has the configuration of a semi-rigid polymer element that extends between plates 51 and 52. Additionally, a telescoping member 59 that freely collapses but also resists tension may be utilized. Accordingly, a variety of other materials or structures may be utilized with tethers 53 or in place of tethers 53.

Figure 12G:
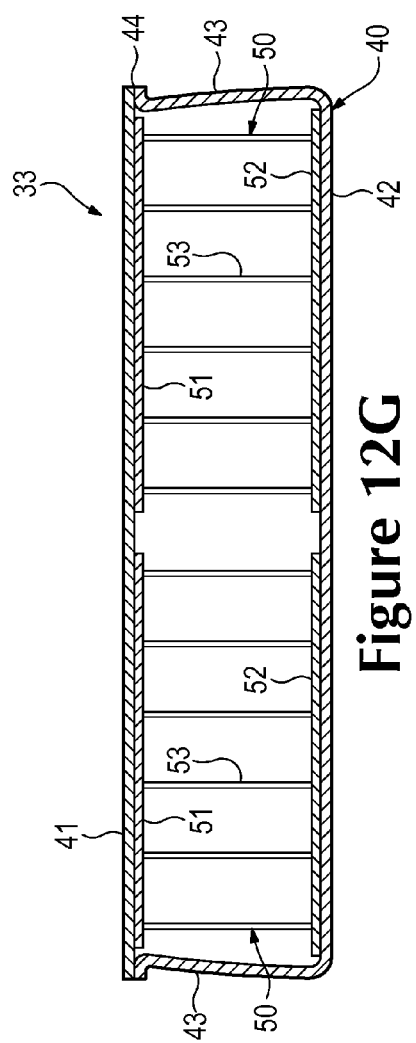
FIGS. 12A-12N are cross-sectional views corresponding with FIG. 8B and depicting further configurations of the first chamber.
Figure 12H:
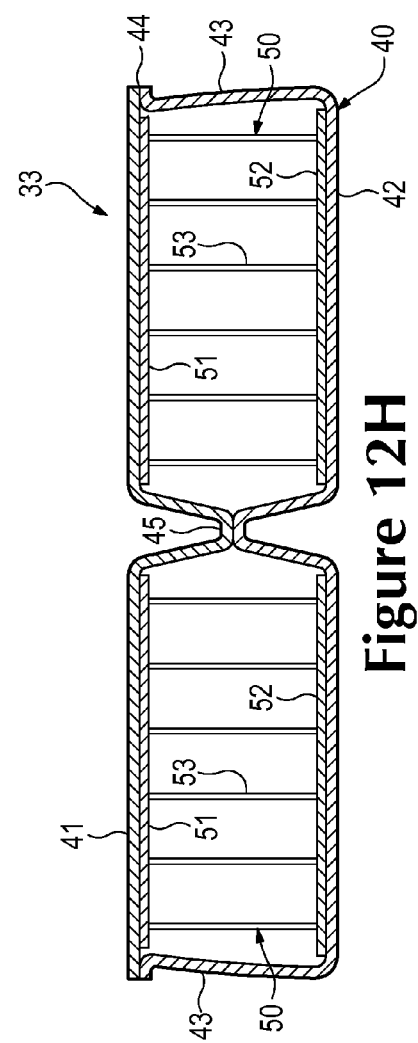
Figure 13:
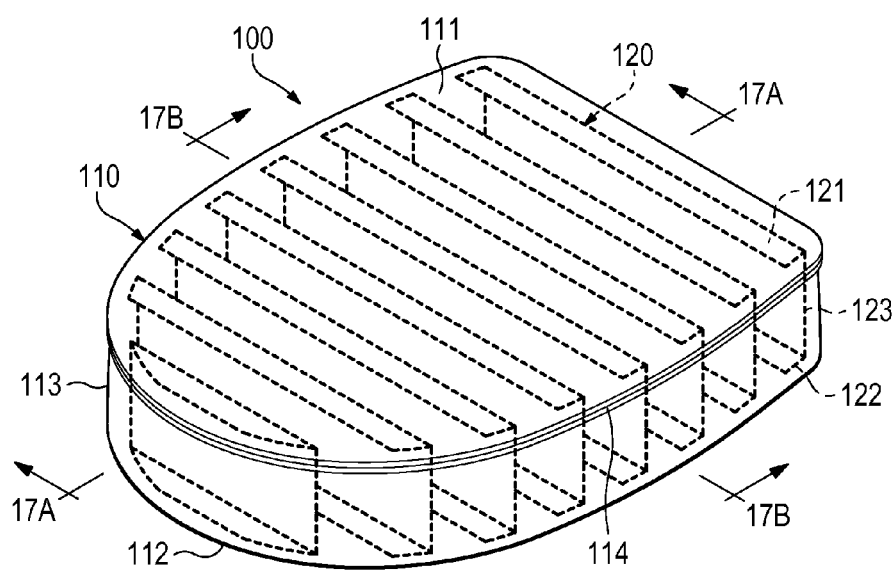
FIG. 13 is a perspective view of a second chamber.
Figure 14:
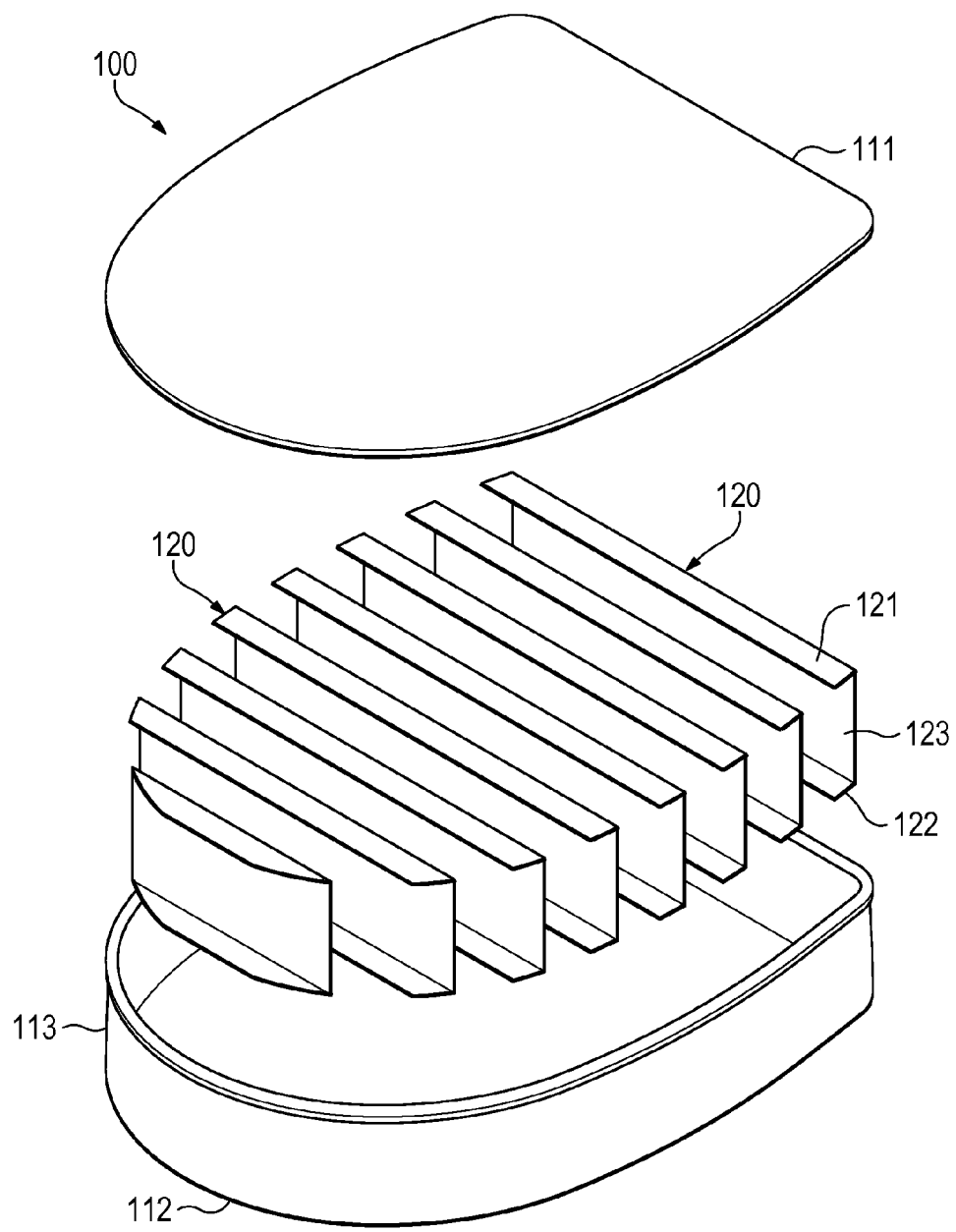
FIG. 14 is an exploded perspective view of the second chamber.
Figure 15:
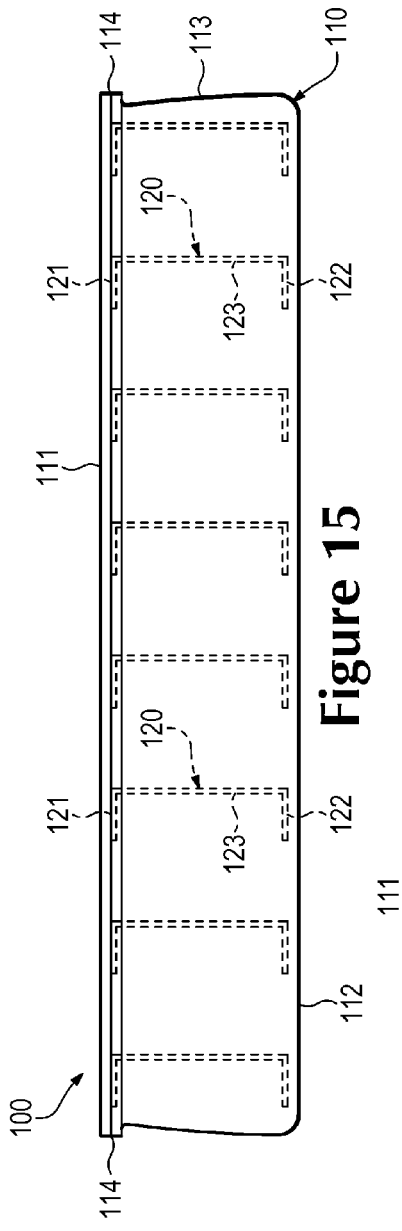
FIG. 15 is a side elevational view of the second chamber.
Figure 16:
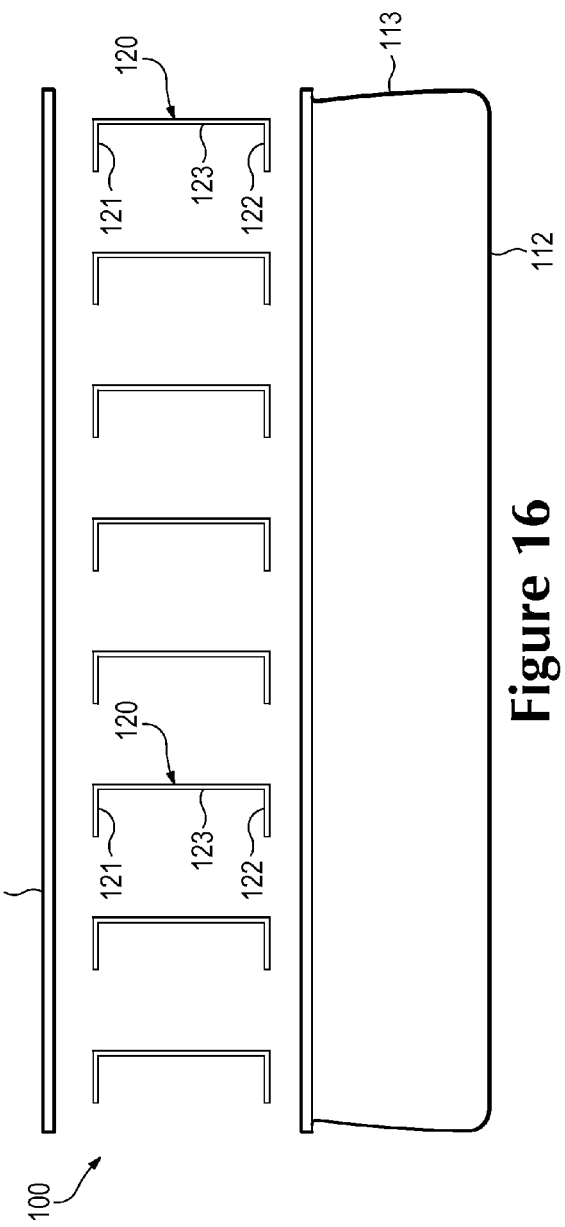
FIG. 16 is an exploded side elevational view of the second chamber.
Figure 17A:
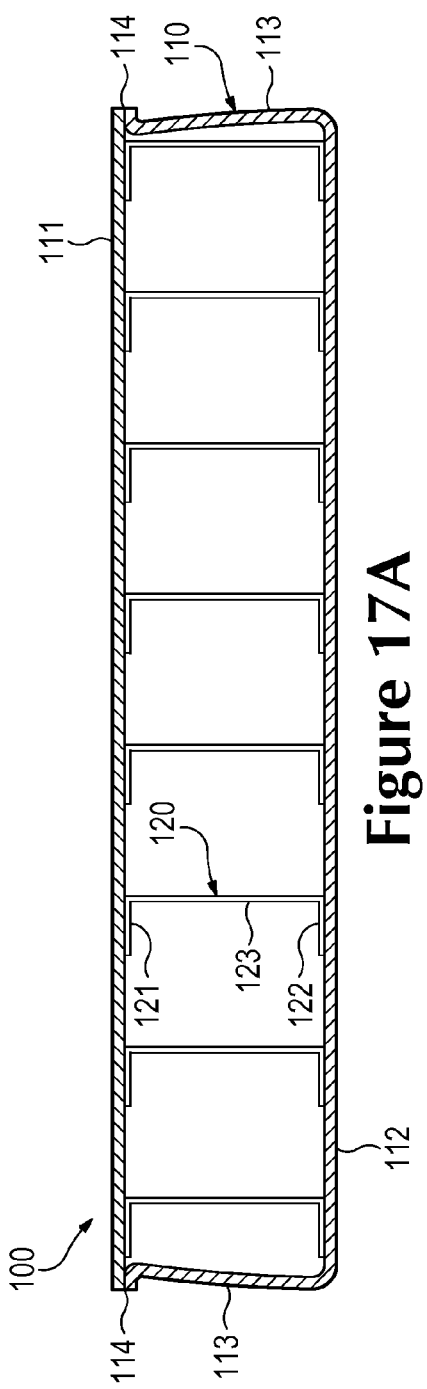
FIGS. 17A and 17B are cross-sectional views of the second chamber, as defined by section lines 17A and 17B in FIG. 13.
Figure 17B:
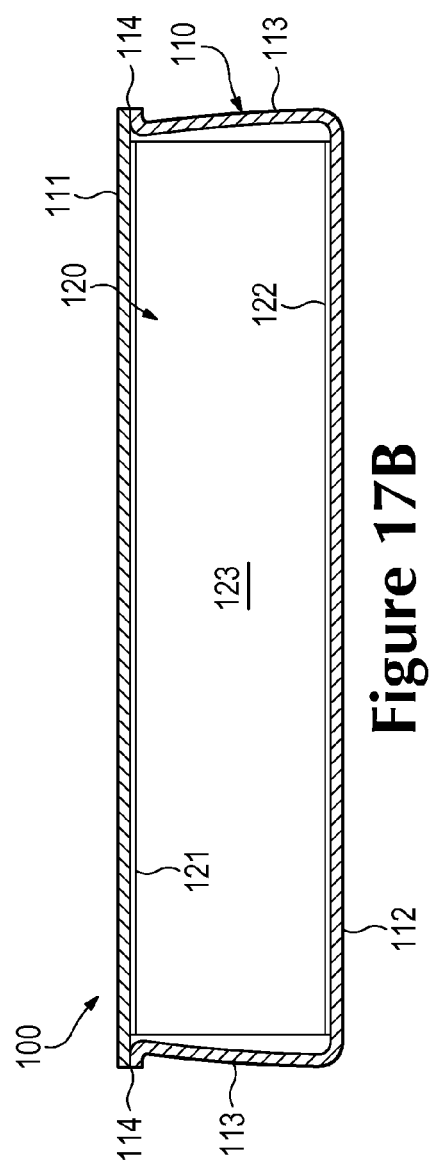
Figure 19:
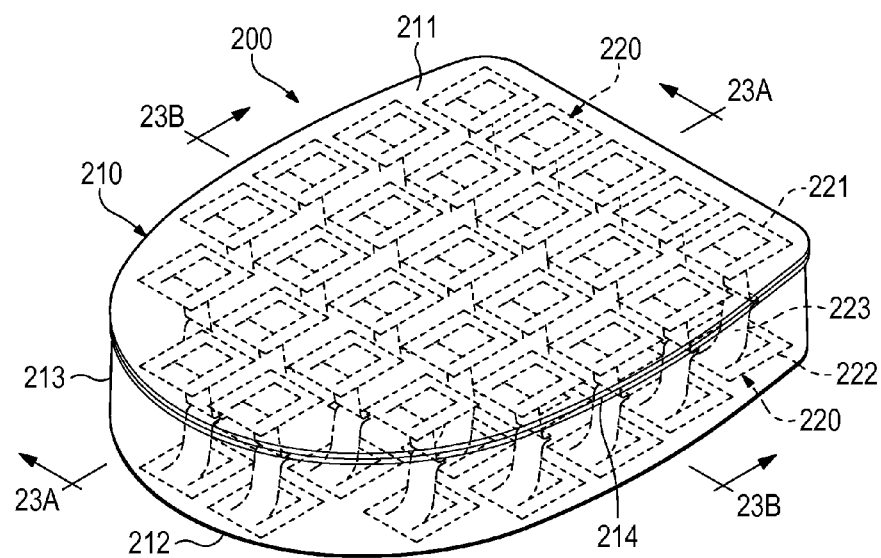
FIG. 19 is a perspective view of a third chamber.
Figure 20:
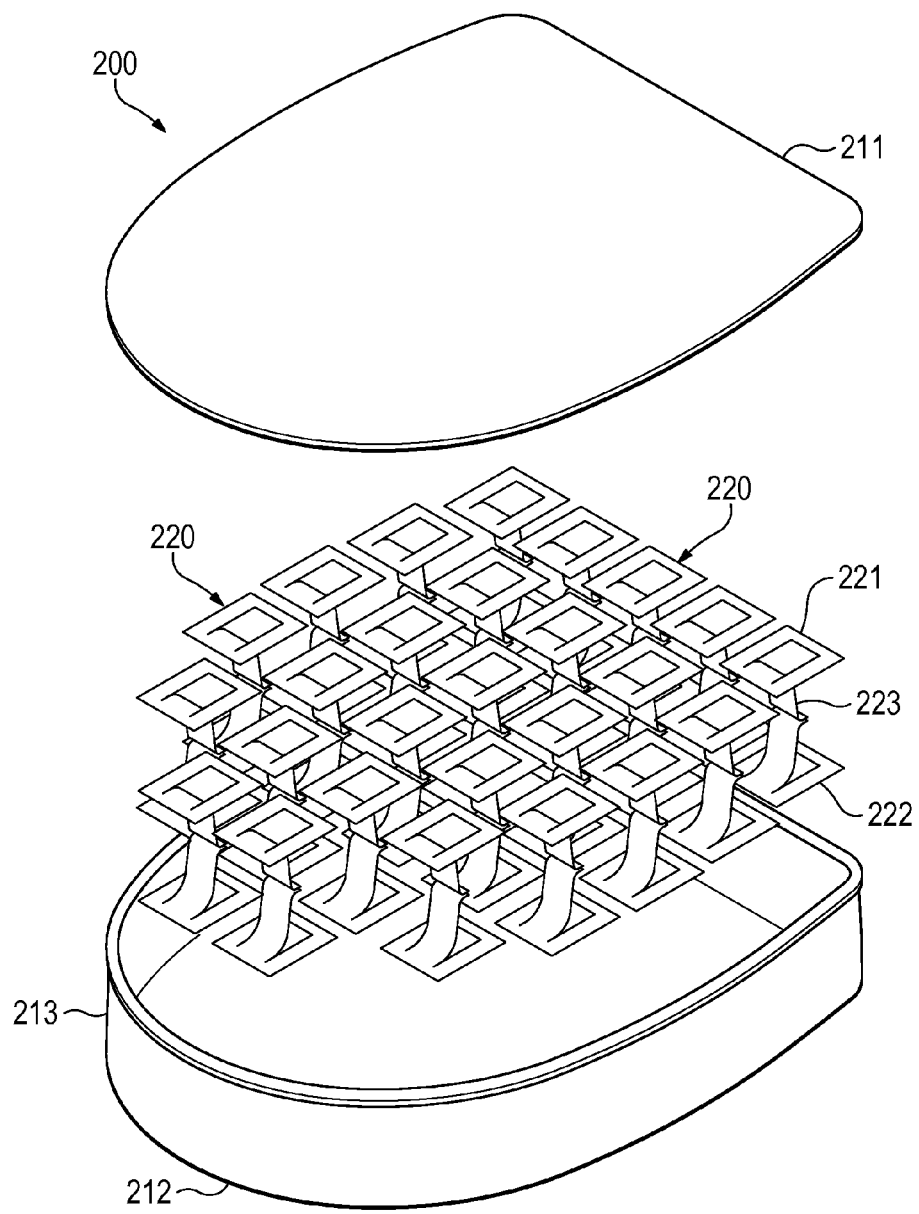
FIG. 20 is an exploded perspective view of the third chamber.
Figure 21:
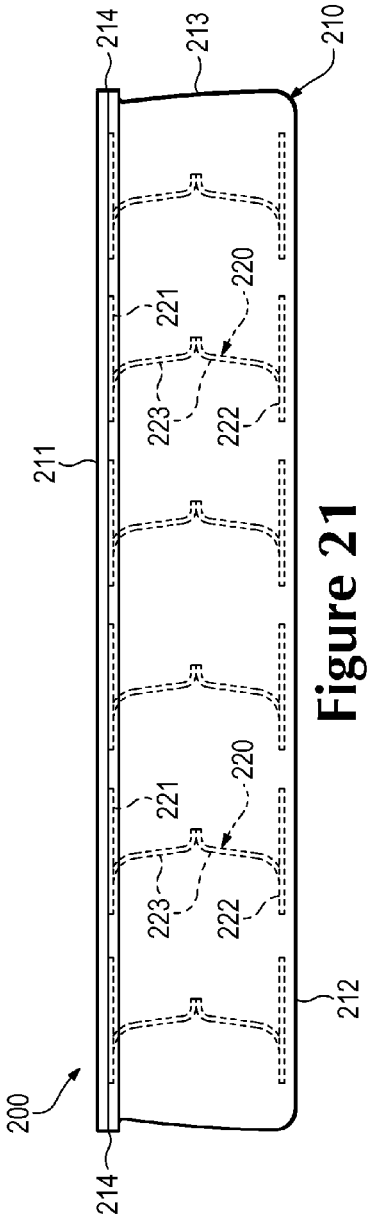
FIG. 21 is a side elevational view of the third chamber.
Figure 22:
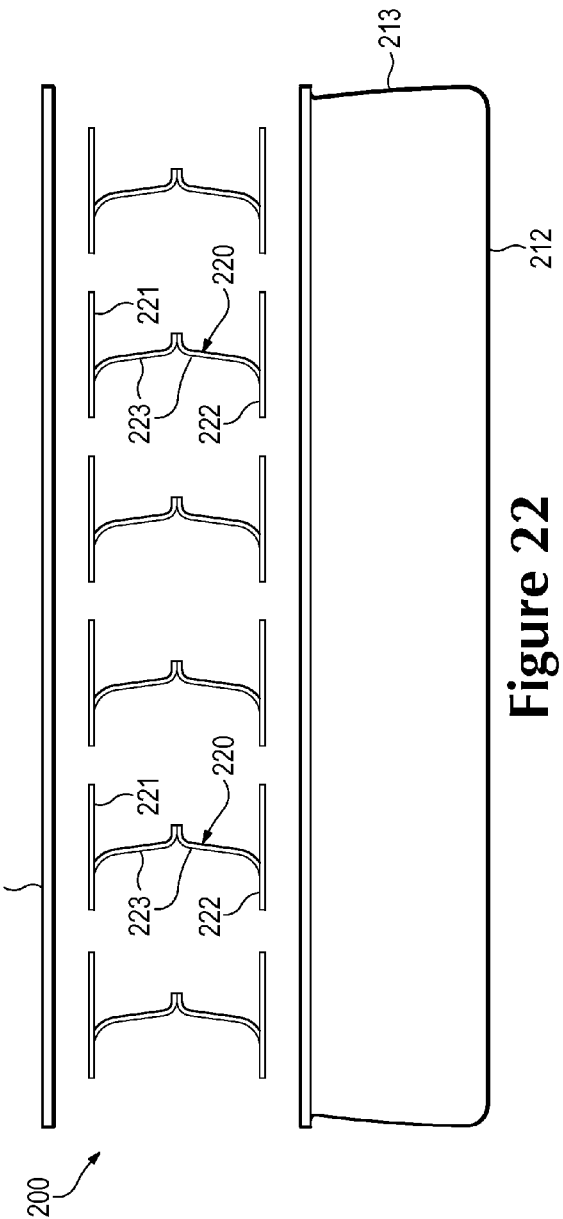
FIG. 22 is an exploded side elevational view of the third chamber.

Although a single plate 51 and a single plate 52 may be utilized in chamber 33, some configurations may incorporate multiple plates 51 and 52. Referring to FIG. 12G, two plates 51 and two plates 52 are located within the interior cavity of barrier 40. An advantage to this configuration is that each of plates 51 may deflect independently when compressed by the foot. A similar configuration is depicted in FIG. 12H, wherein a central bond 45 joins barrier portions 41 and 42 in the central area of chamber 33. Bond 45 may, for example, form separate subchambers within chamber 33, which may be pressurized differently to affect the compressibility of different areas of chamber 33. As an additional matter, each of plates 51 or each of plates 52 may be formed from different materials to impart different properties to various areas of chamber 33.

A further configurations of chamber 33 is depicted in FIG. 12I as including a tether element 60 that has an upper tie piece 61, a lower tie piece 62, and a tether 63. Whereas upper tie piece 61 is secured, bonded, or otherwise joined to upper barrier portion 41, lower tie piece 62 is secured, bonded, or otherwise joined to lower barrier portion 42. Additionally, tether 63 is joined to each of tie pieces 61 and 62 and extends through the interior cavity. In this configuration, tether 63 is placed in tension by the outward force of the pressurized fluid within chamber 33. Tie pieces 61 and 62 are similar to plates 51 and 52, but are generally associated with a single tether 63 or a relatively small number of tethers 63, rather than multiple tethers. Although tie pieces 61 and 62 may be round disks with common diameters, tie pieces 61 and 62 may have any shape or size. By modifying the lengths of tethers 63, various contours may be imparted to chamber 33. For example, FIG. 12J depicts chamber 33 as having a tapered configuration, and FIG. 12K depicts chamber 33 as having a central depression. In further configurations, tie pieces 61 and 62 may be offset from each other to impart a diagonal configuration to tethers 63, as depicted in FIG. 12L.

Some configurations of chamber 33 may have both a tether element 50 and one or more tether elements 60, as depicted in FIG. 12M. That is, chamber 33 may have (a) a first area that includes tether element 50 and (b) a second area that includes a plurality of tether elements 60. Given the difference in sizes of tether element 50 and the individual tether elements 60, the compression characteristics of chamber 33 differ in areas where tether element 50 is present and in areas where tether elements 60 are present. More particularly, the deflection of chamber 33 when a force is applied to a particular area may be different, depending upon the type of tether element that is utilized. Accordingly, tether element 50 and tether elements 60 may both be utilized in chamber 33 to impart different compression characteristics to different areas of chamber 33.

As discussed above, chamber 33 may have (a) a first area that includes tether element 50 and (b) a second area that includes a plurality of tether elements 60 in order to impart different compression characteristics to the first and second areas of chamber 33. As an example, the plurality of tether elements 60 may be utilized in lateral side 14 to impart greater deflection as the heel compresses sole structure 30, and tether element 50 may be utilized in medial side 15 to impart a stiffer deflection as the foot rolls or pronates toward medial side 15. As another example, the plurality of tether elements 60 may be utilized in heel region 13 to impart greater deflection as the heel compresses sole structure 30, and tether element 50 may be utilized in forefoot region 11 to impart a stiffer deflection. In other configurations, the plurality of tether elements 60 may be utilized in forefoot region 11 and tether elements 60 may be utilized in heel region 13. In either configuration, however, tether element 50 and a plurality of tether elements 60 may be utilized in combination to impart different compression characteristics to different areas of footwear 10. Moreover, any of the additional tether element configurations shown in FIG. 12F may be utilized in combination with tether element 50 and one or more of tether elements 60 to vary the compression characteristics in different areas of chamber 33 or other chambers.

Some conventional chambers utilize bonds between opposite surfaces to prevent the barrier from expanding outward and retaining the intended shape of the chamber. Often, the bonds form indentations or depressions in the upper and lower surfaces of the chamber and have different compression characteristics than other areas of the chamber (i.e., the areas without the bonds). Referring to FIG. 12N, chamber 33 has a configuration wherein areas with the various tether elements 60 form indentations in barrier portions 41 and 42. That is, barrier portions 41 and 42 form depressions in areas where tie pieces 61 and 62 are secured to barrier 40. In some configurations, these depressions may be molded or otherwise formed in barrier portions 41 and 42, or barrier 40 may take this shape due to the pressure of the fluid within barrier 40. In other configurations, a variety of other tensile members (e.g., foam members, spacer textiles) may be utilized in place of tether elements 60.

Second Chamber Configuration

The various configurations of chamber 33 discussed above provide examples of fluid-filled chambers that may be incorporated into footwear 10 or other articles of footwear. A variety of other fluid-filled chambers may also be incorporated into footwear 10 or the other articles of footwear, including a chamber 100. Referring to FIGS. 13-17B, chamber 100 has a barrier 110 and a plurality of tether elements 120. Barrier 110 forms an exterior of chamber 100 and defines an interior cavity for receiving both a pressurized fluid and tether elements 120. Barrier 110 includes a first or upper barrier portion 111, an opposite second or lower barrier portion 112, and a sidewall barrier portion 113 that extends around a periphery of chamber 100 and between barrier portions 111 and 112. In addition, barrier 110 includes a peripheral bond 114, which may be absent in some configurations. Tether elements 120 are located within the interior cavity and have the configurations of textile or polymer sheets, for example. Either adhesive bonding or thermobonding, for example, may be utilized to secure tether elements 120 to barrier 110. Any of the manufacturing processes, materials, fluids, fluid pressures, and other features of barrier 40 discussed above may also be utilized for barrier 110.

Tether elements 120 are secured to each of barrier portions 111 and 112 in order to retain the intended shape of chamber 100 when pressurized. More particularly, tether elements 120 extend across the interior cavity and are placed in tension by the outward force of the pressurized fluid upon barrier 110, thereby preventing barrier 110 from expanding outward and retaining the intended shape of chamber 100. That is, tether elements 120 prevent chamber 100 from expanding outward or otherwise distending due to the pressure of the fluid.

Although a variety of materials may be utilized, tether elements 120 may be formed from any generally two-dimensional material. As utilized with respect to the present invention, the term "two-dimensional material" or variants thereof is intended to encompass generally flat materials exhibiting a length and a width that are substantially greater than a thickness. Accordingly, suitable materials for tether elements 120 include various textiles, polymer sheets, or combinations of textiles and polymer sheets, for example. Textiles are generally manufactured from fibers, filaments, or yarns that are, for example, either (a) produced directly from webs of fibers by bonding, fusing, or interlocking to construct non-woven fabrics and felts or (b) formed through a mechanical manipulation of yarn to produce a woven or knitted fabric. The textiles may incorporate fibers that are arranged to impart one-directional stretch or multi-directional stretch. The polymer sheets may be extruded, rolled, or otherwise formed from a polymer material to exhibit a generally flat aspect. Two-dimensional materials may also encompass laminated or otherwise layered materials that include two or more layers of textiles, polymer sheets, or combinations of textiles and polymer sheets. In addition to textiles and polymer sheets, other two-dimensional materials may be utilized for tether elements 120. In some configurations, mesh materials or perforated materials may be utilized for tether elements 120.

Each of tether elements 120 are formed from a single element of a two-dimensional material, such as a textile or polymer sheet. Moreover, each of tether elements 120 have an upper end area 121, a lower end area 122, and a central area 123. Whereas upper end area 121 is secured, bonded, or otherwise joined to upper barrier portion 111, lower end area 122 is secured, bonded, or otherwise joined to lower barrier portion 112. In this configuration, central area 123 extends through the interior cavity and is placed in tension by the outward force of the pressurized fluid within chamber 100.

Although the structure of chamber 100 discussed above and depicted in the figures provides a suitable example of a configuration that may be utilized in footwear 10, a variety of other configurations may also be utilized. Referring to FIG. 18A, tether elements 120 are secured to offset areas of barrier portions 111 and 112 in order to impart a diagonal orientation to central areas 123. More particularly, end areas 121 and 122 are secured to offset locations to induce the slanting or diagonal orientation in central areas 123. As discussed above, the diagonal orientation resists deformation in chamber 100, thereby enhancing the overall stability of footwear 10 during walking, running, or other ambulatory activities. Referring to FIG. 18B, a single tether element 120 is joined to barrier portions 111 and 112 in various locations and has a zigzagging configuration within chamber 100. By modifying the lengths of tether elements 120, various contours may be imparted to chamber 100. For example, FIG. 18C depicts chamber 100 as having a tapered configuration, and FIG. 18D depicts chamber 100 as having a central depression. Each of these contours are formed by selectively utilizing tether elements 120 with varying lengths.

Third Chamber Configuration

In the various configurations of chamber 100 discussed above, each of tether elements 120 are formed from a single element of a two-dimensional material. In some configurations, two or more elements of a two-dimensional material may be utilized to form tether elements. Referring to FIGS. 19-23B, a chamber 200 having a barrier 210 and a plurality of tether elements 220 is depicted. Barrier 210 forms an exterior of chamber 200 and defines an interior cavity for receiving both a pressurized fluid and tether elements 220. Barrier 210 includes a first or upper barrier portion 211, an opposite second or lower barrier portion 212, and a sidewall barrier portion 213 that extends around a periphery of chamber 200 and between barrier portions 211 and 212. In addition, barrier 210 includes a peripheral bond 214, which may be absent in some configurations. Tether elements 220 are located within the interior cavity and are formed from at least two elements of a two-dimensional material, such as textile or polymer sheets. Either adhesive bonding or thermobonding, for example, may be utilized to secure tether elements 220 to barrier 210.

Tether elements 220 are secured to each of barrier portions 211 and 212 in order to retain the intended shape of chamber 200 when pressurized. More particularly, tether elements 220 extend across the interior cavity and are placed in tension by the outward force of the pressurized fluid upon barrier 210, thereby preventing barrier 210 from expanding outward and retaining the intended shape of chamber 200. That is, tether elements 220 prevent chamber 200 from expanding outward or otherwise distending due to the pressure of the fluid. Each of tether elements 220 are formed from an upper sheet 221 that is joined to upper barrier portion 211 and a lower sheet 222 that is joined to lower barrier portion 212. Each of sheets 221 and 222 have an incision or cut that forms a central tab 223. Whereas peripheral areas of sheets 221 and 222 are joined with barrier 210, tabs 223 are unsecured and extend into the interior cavity. End areas of both tabs 223 contact each other and are joined to secure sheets 221 and 222 together. When chamber 200 is pressurized, tabs 223 are placed in tension and extend across the interior cavity, thereby preventing chamber 200 from expanding outward or otherwise distending due to the pressure of the fluid.

Any of the manufacturing processes, materials, fluids, fluid pressures, and other features of barrier 40 discussed above may also be utilized for barrier 210. In order to prevent tabs 223 from being bonded to barrier 210, a blocker material may be utilized. More particularly, a material that inhibits bonding between tabs 223 and barrier 210 (e.g., polyethylene terephthalate, silicone, polytetrafluoroethylene) may be utilized to ensure that tabs 223 remain free to extend across the interior cavity between barrier portions 211 and 212. In many configurations, the blocker material may be located on tabs 223, but may also be on surfaces of barrier 210 or may be a film, for example, that extends between tabs 223 and surfaces of barrier 210.

Figure 24C:
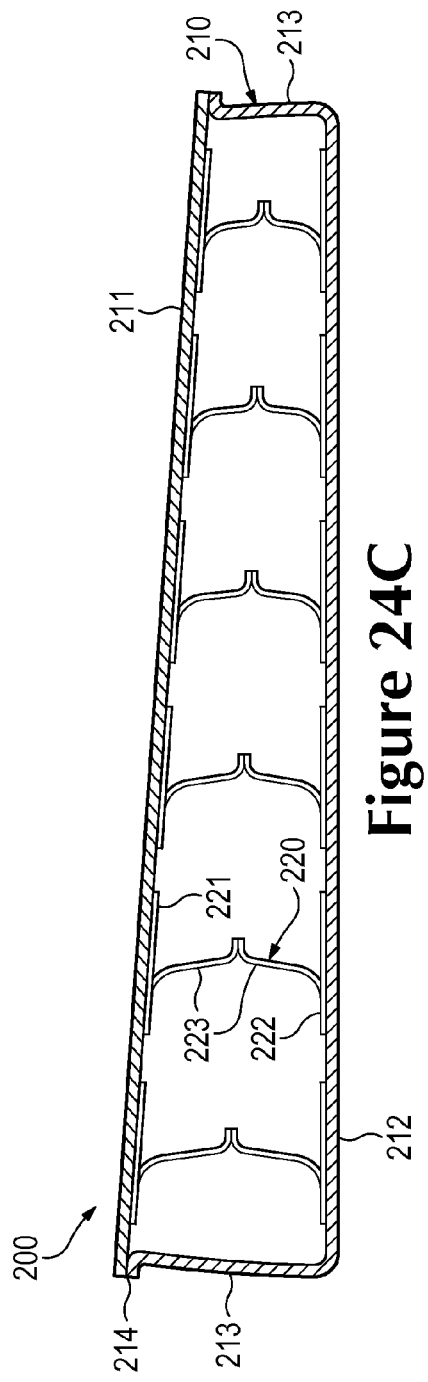
Figure 24D:
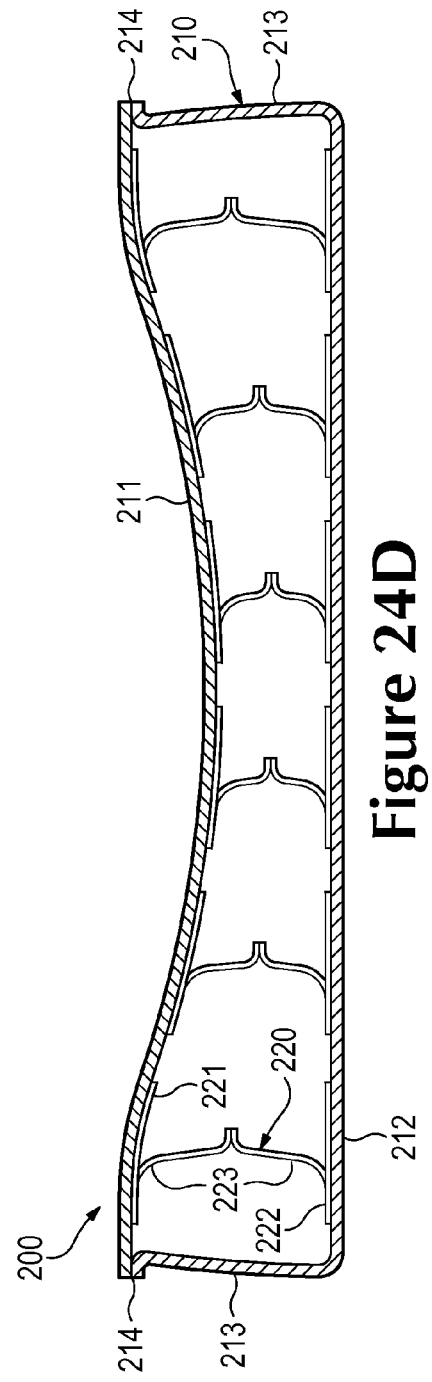
Figure 25:
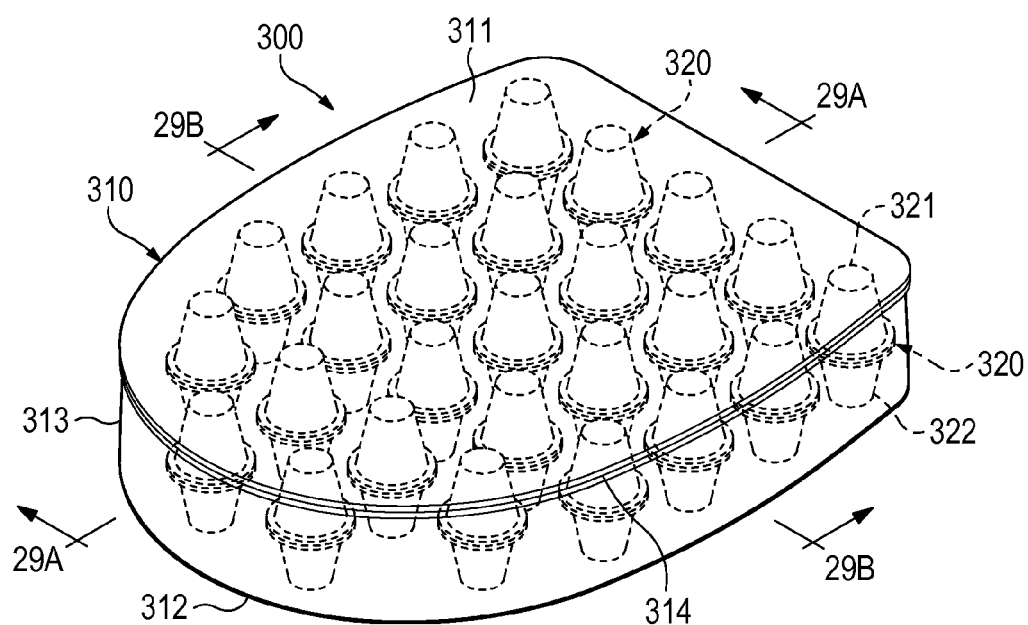
FIG. 25 is a perspective view of a fourth chamber.
Figure 26:
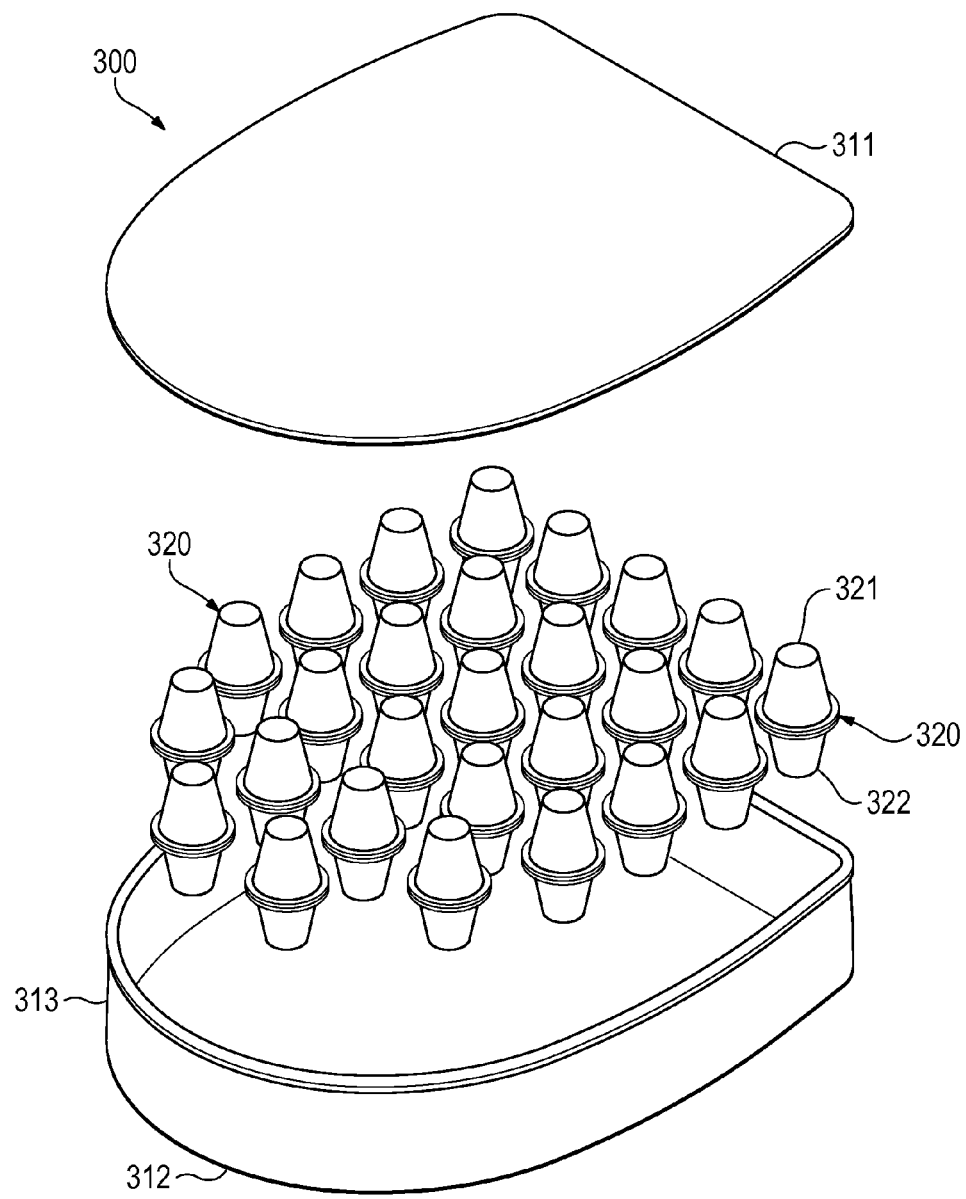
FIG. 26 is an exploded perspective view of the fourth chamber.
Figure 27:
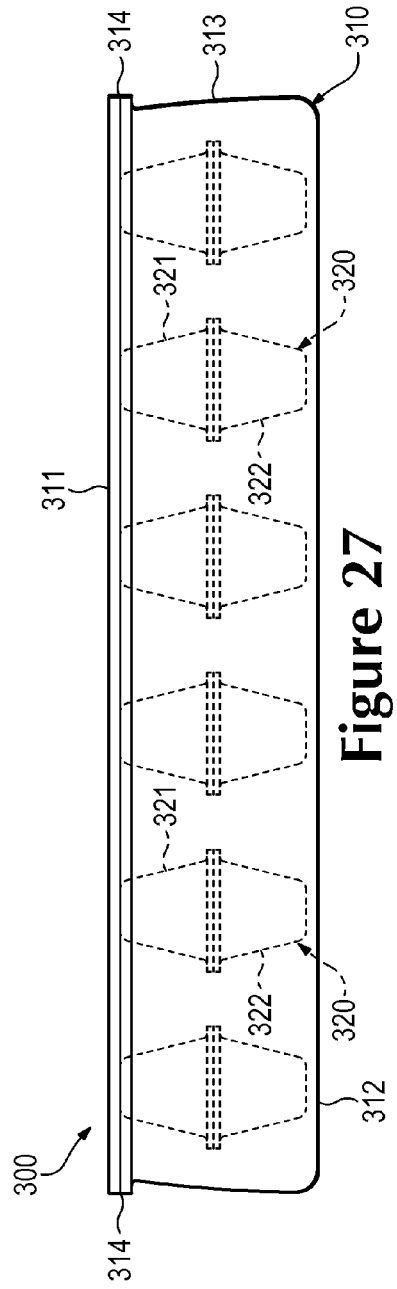
FIG. 27 is a side elevational view of the fourth chamber.
Figure 28:
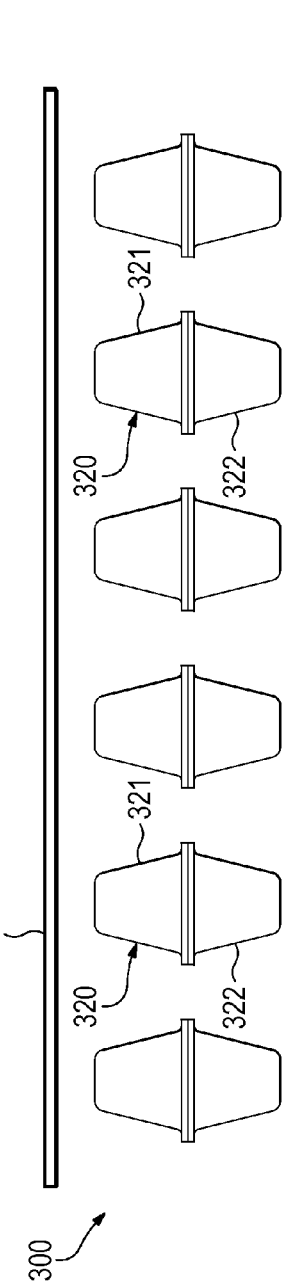
FIG. 28 is an exploded side elevational view of the fourth chamber.
Figure 29A:
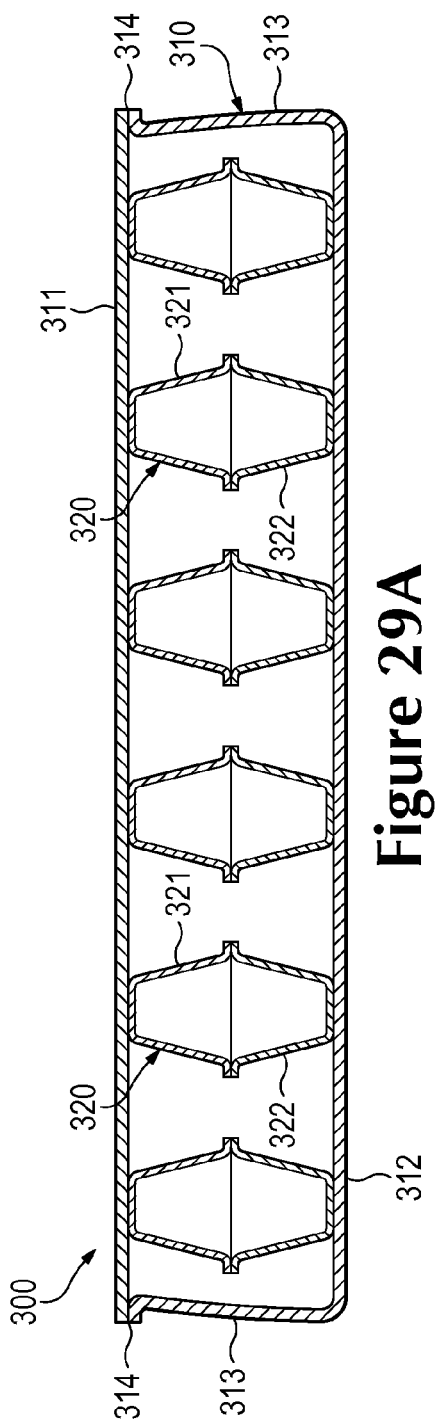
FIGS. 29A and 29B are cross-sectional views of the fourth chamber, as defined by section lines 29A and 29B in FIG. 25.
Figure 29B:
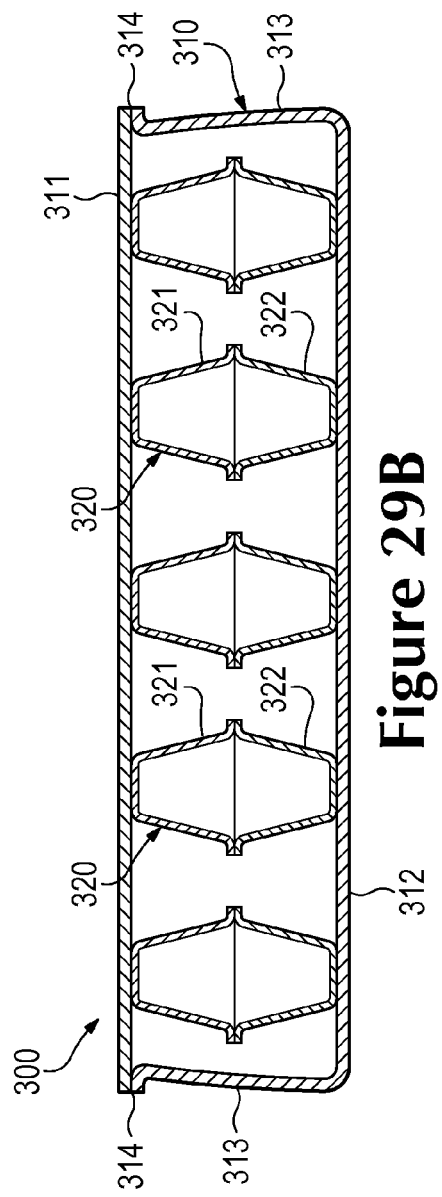

Although the structure of chamber 200 discussed above and depicted in the figures provides a suitable example of a configuration that may be utilized in footwear 10, a variety of other configurations may also be utilized. Referring to FIG. 24A, tether elements 220 are secured to offset areas of barrier portions 211 and 212 in order to impart a diagonal orientation. Referring to FIG. 24B, a single sheet 221 and a single sheet 222 define a plurality of tabs 223. Whereas each of sheets 221 and 222 may form a single tab 223, sheets 221 and 222 may form multiple tabs 223. By modifying the lengths of tabs 223, various contours may be imparted to chamber 200. For example, FIG. 24C depicts chamber 200 as having a tapered configuration, and FIG. 24D depicts chamber 200 as having a central depression. Each of these contours are formed by selectively utilizing tabs 223 with varying lengths.

Fourth Chamber Configuration

Another configuration wherein two or more elements of a two-dimensional material are utilized to form tether elements is depicted as a chamber 300 in FIGS. 25-29B. Chamber 300 having a barrier 310 and a plurality of tether elements 320. Barrier 310 forms an exterior of chamber 300 and defines an interior cavity for receiving both a pressurized fluid and tether elements 320. Barrier 310 includes a first or upper barrier portion 311, an opposite second or lower barrier portion 312, and a sidewall barrier portion 313 that extends around a periphery of chamber 300 and between barrier portions 311 and 312. In addition, barrier 310 includes a peripheral bond 314, which may be absent in some configurations. Tether elements 320 are located within the interior cavity and are formed from at least two elements of a two-dimensional material, such as textile or polymer sheets. Either adhesive bonding or thermobonding, for example, may be utilized to secure tether elements 320 to barrier 310.

Tether elements 320 are secured to each of barrier portions 311 and 212 in order to retain the intended shape of chamber 300 when pressurized. More particularly, tether elements 320 extend across the interior cavity and are placed in tension by the outward force of the pressurized fluid upon barrier 310, thereby preventing barrier 310 from expanding outward and retaining the intended shape of chamber 300. That is, tether elements 320 prevent chamber 300 from expanding outward or otherwise distending due to the pressure of the fluid. Each of tether elements 320 are formed from an upper sheet 321 that is joined to upper barrier portion 311 and a lower sheet 322 that is joined to lower barrier portion 312. Each of sheets 321 and 322 have circular or disk-shaped configuration. Whereas peripheral areas of sheets 321 and 322 are joined with each other, central areas are joined to barrier portions 311 and 312. Once placed in tension, sheets 321 and 322 may distend to form the shapes seen in the various figures. When chamber 300 is pressurized, sheets 321 and 322 are placed in tension and extend across the interior cavity, thereby preventing chamber 300 from expanding outward or otherwise distending due to the pressure of the fluid.

Any of the manufacturing processes, materials, fluids, fluid pressures, and other features of barrier 40 discussed above may also be utilized for barrier 310. In order to prevent peripheral areas of sheets 321 and 322 from being bonded to barrier 210, a blocker material may be utilized. More particularly, a material that inhibits bonding between the peripheral areas of sheets 321 and 322 and barrier 310 may be utilized to ensure that sheets 321 and 322 remain free to extend across the interior cavity.

Although the structure of chamber 300 discussed above and depicted in the figures provides a suitable example of a configuration that may be utilized in footwear 10, a variety of other configurations may also be utilized. Referring to FIG. 30A, the peripheral areas of sheets 321 and 322 are bonded to barrier 310, whereas the central areas of sheets 321 and 322 are bonded to each other. By modifying the diameters or other dimensions of sheets 321 and 322, various contours may be imparted to chamber 200. For example, FIG. 30B depicts chamber 300 as having a tapered configuration, but a central depression or other contour may also be formed by selectively varying the dimensions of sheets 321 and 322.

Conclusion

Figure 30C:
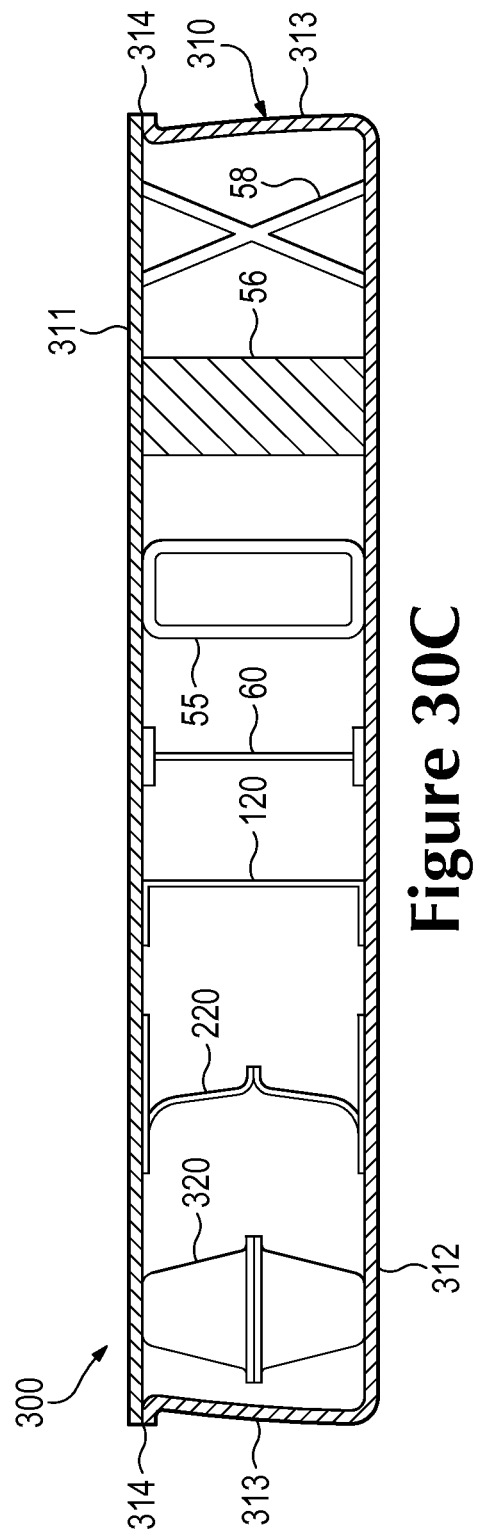

The above discussion and various figures disclose a variety of fluid-filled chambers that may be utilized in footwear 10 or other articles of footwear, as well as a variety of other products (e.g., backpack straps, mats for yoga, seat cushions, and protective apparel). Although many of the concepts regarding the barriers and tensile elements are discussed individually, fluid-filled chambers may gain advantages from combinations of these concepts. That is, various types of tether elements may be utilized in a single chamber to provide different properties to different areas of the chamber. For example, FIG. 30C depicts a configuration wherein chamber 300 includes each of tensile elements 60, 120, 220, and 320, as well as fluid-filled member 55, foam member 56, and truss member 58. Whereas tensile elements 60, 120, 220, and 320 may have a configuration that collapses with the compression of chamber 300, members 55, 56, and 58 may form more rigid structures that resist collapsing. This configuration may be utilized, therefore, to impart compressibility to one area of chamber 300, while limiting compressibility in another area. Accordingly, various types of tensile elements may be utilized to impart different properties to a fluid-filled chamber.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear having an upper and a sole structure secured to the upper, at least one of the upper and the sole structure incorporating a chamber comprising:
    an outer barrier formed from a polymer material that defines an interior cavity, the barrier having (a) a first portion that forms a first surface of the chamber and (b) a second portion that forms an opposite second surface of the chamber; and
    a tether element located within the interior cavity and including a first sheet and a second sheet, the first sheet being secured to the first portion of the barrier and including a first tab portion having an integral, one-piece construction with the first sheet, the second sheet being secured to the second portion of the barrier and including a second tab portion having an integral, one-piece construction with the second sheet, the first tab portion extending away from the first sheet toward the second sheet and the second tab portion extending away from the second sheet toward the first sheet, the first tab portion and the second tab portion being joined together between the first sheet and the second sheet and placed under tension to restrict a shape of the chamber.

2. The article of footwear recited in claim 1, wherein a fluid is located within the interior cavity, the fluid being pressurized to place an outward force upon the barrier and induce tension in the tether element.

3. The article of footwear recited in claim 1, wherein the first sheet and the second sheet are formed from at least one of a textile and a polymer layer.

4. The article of footwear recited in claim 1, wherein a periphery of the first sheet is joined to a periphery of the second sheet, a central area of the first sheet is secured to the first portion of the barrier, and a central area of the second sheet is secured to the second portion of the barrier.

5. The article of footwear recited in claim 1, wherein the first sheet and the second sheet are strips of material, a first end of the first sheet being secured to the first portion of the barrier, and a second end of the first sheet being secured to the second sheet.

6. The article of footwear recited in claim 1, wherein the first sheet includes an incision that defines the first tab portion and a peripheral portion, the peripheral portion being secured to the first portion of the barrier, and the first tab portion being secured to the second sheet at the second tab portion.

7. The article of footwear recited in claim 1, wherein the chamber extends from a forefoot region to a heel region of the sole structure.

8. The article of footwear recited in claim 1, wherein the chamber extends from a lateral side to a medial side of the sole structure.

9. The article of footwear recited in claim 1, wherein the first sheet includes a first peripheral portion attached to the first portion of the barrier with the first tab portion extending from the first peripheral portion and the second sheet includes a second peripheral portion attached to the second portion of the barrier with the second tab portion extending from the second peripheral portion.

10. The article of footwear recited in claim 9, wherein the first peripheral portion defines a first opening in the first sheet and the second peripheral portion defines a second opening in the second sheet, the first portion of the barrier being exposed in the first opening and the second portion of the barrier being exposed in the second opening.

11. The article of footwear recited in claim 10, wherein the first tab portion is cut from the first sheet and defines a shape of the first opening.

12. The article of footwear recited in claim 10, wherein the second tab portion is cut from the second sheet and defines a shape of the second opening.

13. The article of footwear recited in claim 1, wherein the first tab portion includes a first side facing the second sheet, and the second tab portion includes a second side facing the first sheet, the first side contacting and being joined to the second side.

14. The article of footwear recited in claim 1, further comprising a blocker material operable to inhibit bonding between the barrier and the first tab portion and between the barrier and the second tab portion.

15. The article of footwear recited in claim 14, wherein the blocker material is disposed on the barrier.

* * * * *